United States Patent
Kusumi et al.

(10) Patent No.: US 10,344,360 B2
(45) Date of Patent: Jul. 9, 2019

(54) STEEL SHEET FOR HOT STAMPING USE, METHOD OF PRODUCTION OF SAME, AND METHOD OF PRODUCTION OF HIGH STRENGTH PART

(75) Inventors: Kazuhisa Kusumi, Tokyo (JP); Yuji Ogawa, Tokyo (JP); Masayuki Abe, Tokyo (JP); Hidekuni Murakami, Tokyo (JP); Kengo Takeda, Tokyo (JP); Jun Maki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 284 days.

(21) Appl. No.: 14/003,881

(22) PCT Filed: Mar. 9, 2011

(86) PCT No.: PCT/JP2011/056124
§ 371 (c)(1),
(2), (4) Date: Sep. 9, 2013

(87) PCT Pub. No.: WO2012/120692
PCT Pub. Date: Sep. 13, 2012

(65) Prior Publication Data
US 2013/0340899 A1    Dec. 26, 2013

(51) Int. Cl.
*C22C 38/04* (2006.01)
*C22C 38/06* (2006.01)
(Continued)

(52) U.S. Cl.
CPC ............... *C22C 38/02* (2013.01); *B21B 1/22* (2013.01); *B21D 22/022* (2013.01);
(Continued)

(58) Field of Classification Search
USPC ........................................................ 148/654
See application file for complete search history.

(56) References Cited

U.S. PATENT DOCUMENTS

2003/0221752 A1* 12/2003 Utsumi .................. C22C 38/02
                                                          148/334
2008/0286603 A1   11/2008 Oh et al.
2010/0247957 A1    9/2010 Hoshika et al.

FOREIGN PATENT DOCUMENTS

CN          101316942      12/2008
EP          1442147         8/2004
(Continued)

OTHER PUBLICATIONS

"Impurities in Steel." Metallurgy. N.p., Feb. 11, 2009. Web. Dec. 7, 2015.*
(Continued)

*Primary Examiner* — Colleen P Dunn
*Assistant Examiner* — Anthony M Liang
(74) *Attorney, Agent, or Firm* — Birch, Stewart, Kolasch & Birch, LLP.

(57) ABSTRACT

The present invention has as its object the provision of steel sheet for hot stamping use which is excellent in part strength after hot stamping and delayed fracture resistance comprised of large C content high strength steel sheet in which effective hydrogen traps are formed in the steel material.

The steel sheet of the present invention solves this problem by forming Fe—Mn-based composite oxides in the steel sheet and trapping hydrogen at the interfaces of the composite oxides and matrix steel and in the voids around the composite oxides.

Specifically, it provides steel sheet for hot stamping use which is comprised of chemical ingredients which contain, by mass %, C: 0.05 to 0.40%, Si: 0.02% or less, Mn: 0.1 to 3%, S: 0.02% or less, P: 0.03% or less, Al: 0.005% or less, Ti: 0.01% or less, N: 0.01% or less, one or both of Cr and Mo in a total of 0.005 to 1%, and O: 0.003 to 0.03% and which have a balance of Fe and unavoidable impurities and which contains average diameter 0.1 to 15 μm Fe—Mn- (Continued)

based composite oxide particles dispersed in the steel sheet or furthermore has crushed voids around the composite oxide particles, a method of production of the same, and a method of production of a hot stamped high strength part.

5 Claims, 6 Drawing Sheets

(51) Int. Cl.
*C22C 38/22* (2006.01)
*C22C 38/02* (2006.01)
*B21D 22/02* (2006.01)
*C22C 38/00* (2006.01)
*C22C 38/32* (2006.01)
*B21B 1/22* (2006.01)
*C21D 8/00* (2006.01)
*C22C 38/14* (2006.01)
*C22C 38/28* (2006.01)
*B32B 15/01* (2006.01)
*C22C 38/12* (2006.01)
*C22C 38/16* (2006.01)
*C22C 38/24* (2006.01)
*C22C 38/30* (2006.01)
*C21D 6/00* (2006.01)
*C21D 8/02* (2006.01)

(52) U.S. Cl.
CPC ............ *B32B 15/013* (2013.01); *C21D 8/005* (2013.01); *C22C 38/001* (2013.01); *C22C 38/002* (2013.01); *C22C 38/04* (2013.01); *C22C 38/06* (2013.01); *C22C 38/12* (2013.01); *C22C 38/14* (2013.01); *C22C 38/16* (2013.01); *C22C 38/22* (2013.01); *C22C 38/24* (2013.01); *C22C 38/28* (2013.01); *C22C 38/30* (2013.01); *C22C 38/32* (2013.01); *C21D 6/005* (2013.01); *C21D 8/0226* (2013.01); *C21D 8/0236* (2013.01); *C21D 8/0273* (2013.01)

(56) References Cited

FOREIGN PATENT DOCUMENTS

| | | |
|---|---|---|
| EP | 1950317 | 7/2008 |
| EP | 2 067 870 A1 | 6/2009 |
| JP | 01015320 | 1/1989 |
| JP | 10-096031 | 4/1998 |
| JP | 2005-068548 | 3/2005 |
| JP | 2006-009116 | 1/2006 |
| JP | 2006-051543 | 2/2006 |
| JP | 2008284610 | 11/2008 |
| JP | 2009-035793 | 2/2009 |
| WO | 2008/038474 | 3/2008 |

OTHER PUBLICATIONS

"Ferrous Physical Metallurgy: An Overview." Concise Encyclopedia of Building & Construction Materials. Ed. Fred Moavenzadeh. Oxford, England: Pergamon, 1990. 281.*
Search Report dated Sep. 25, 2014 issued in corresponding European Application No. 11860663.
International Search Report dated Jun. 21, 2011 issued in corresponding PCT Application No. PCT/JP2011/056124.
Indian Office Action, dated Dec. 7, 2018, for Indian Application No. 8225/DELNP/2013, along with an English translation.

* cited by examiner

STEEL SHEET FOR HOT STAMPING USE, METHOD OF PRODUCTION OF SAME, AND METHOD OF PRODUCTION OF HIGH STRENGTH PART

This application is a national stage application of International Application No. PCT/JP2011/056124, filed Mar. 9, 2011, the content of which is incorporated by reference in its entirety.

TECHNICAL FIELD

The present invention to steel sheet for hot stamping use which is excellent in delayed fracture resistance, a method of production of the same, and a high strength part which is formed by hot stamping using this steel sheet. In particular, it relates to a method of production of a high strength part which is used for a structural part of an automobile.

BACKGROUND ART

In recent years, reduction of the weight of automobiles has been strongly demanded from the viewpoint of the global environment. In automobile bodies, for example, pillars, door impact beams, bumper beams, and other structural parts for automobiles, high strength steel sheet is being used to reduce the thickness of steel sheet to try to lighten the weight. For this reason, the strength of steel sheet is being raised. In particular, high strength steel sheet with a tensile strength (TS) over 1000 MPa is being developed, but higher strength of steel sheet leads to a drop in the workability and press formability at the time of production of a part. In particular, it becomes more difficult to ensure product precision due to springback etc.

To solve these problems, in recent years, as a technique for simultaneously satisfying higher strength and workability of the steel sheet and product precision, the hot stamping method (press quenching method) has come to be used as a practical method. For example, this is disclosed in PLT 1. This heats steel sheet to an approximately 900° C. or so austenite region, then press forms it hot and, at the time of press forming, brings it into contact with an ordinary temperature die set to quench it and thereby obtain a high strength material. Due to this hot stamping method, the residual stress which is introduced at the time of press forming is also reduced, so the inconveniences of fracture, poor shape freezing, etc. which become problems in high strength steel sheet with a TS of over 1180 MPa are suppressed and production of parts with relative good product precision becomes possible.

In the high strength steel sheet which is used for automobiles etc., the above-mentioned problems become more serious the higher the strength. Further, in particular, in high strength materials of over 1000 MPa, as has been known in the past, there is the inherent problem of hydrogen embrittlement (also called "season cracking" or "delayed fracture"). In the case of steel sheet for hot pressing use, while the residual stress due to pressing at a high temperature is small, hydrogen penetrates the steel at the time of heating before pressing and the susceptibility to hydrogen embrittlement becomes higher due to the residual stress after pressing.

As the method of preventing cracking due to delayed fracture, there is the method of controlling the heating atmosphere at the time of hot stamping. For example, PLT 2 proposes the method of making the hydrogen concentration in the heating atmosphere of the hot stamping 6 vol % or less and making the dew-point 10° C. This relates to a method of control of the heating atmosphere of hot stamping. That is, by controlling the hydrogen concentration and the condensation point, the penetration of external hydrogen into the steel sheet during heating is suppressed. Therefore, this does not improve the steel sheet itself. It can only be applied in hot stamping which has a system for controlling the atmosphere.

In addition, as the steel sheet for hot stamping use, there is known steel sheet which traps the hydrogen which penetrates the steel sheet and thereby prevents delayed fracture. For example, PLT 3 proposes steel sheet for hot stamping use which improves the delayed fracture resistance. This art incorporates average particle size 0.01 to 5.0 μm range Mg oxides, sulfides, composite crystals, and composite precipitates, e.g. one or more composite oxides among them, into the steel in an amount of $1\times10^2$ to $1\times10^7$ per square mm. These oxides and composite crystals and composite precipitates having these as nuclei act as hydrogen trap sites to thereby improve the delayed fracture resistance.

Further, as similar art, PLT 4 discloses the art of producing high strength thin-gauge steel sheet which is excellent in hydrogen embrittlement resistance characterized by making bainite or martensite the biggest phases in terms of area rate, making one or more of Nb, V, Cr, Ti, and Mo oxides, sulfides, nitrides, composite crystals, and composite precipitates in the particles satisfy an average particle size "d": 0.001 to 5.0 μm, a density ρ: 100 to $1\times10^{13}$/mm$^2$, and a ratio of standard deviation σ of average particle size and average particle size "d": σ/d≤1.0, and by having a tensile strength of 980 MPa or more.

Furthermore, in steel sheet for enameling use, to improve the fishscale susceptibility, it is known that it is effective to form voids in the steel sheet to trap the hydrogen. PLT 5 proposes to form Fe—Nb—Mn-based composite oxides in steel sheet and increase the segregation of Nb and Mn in the oxides so as to raise the hydrogen trapping ability. However, the art which is described in PLT 5 is art which assumes steel sheet for enameling use which has a small C (carbon) content (usually 0.01 mass % or less). In large C content high strength steel sheet (C of 0.05 mass % or more) such as steel sheet for automobile use, the oxidizing action of C cannot be ignored. Therefore, this cannot be simply applied.

Further, the amount of hydrogen problematic in steel sheet for enameling use is a high concentration of 10 to 100 ppm, while with high strength steel sheet, an amount of hydrogen of a very low concentration of 1 to 3 ppm is considered a problem.

Therefore, the art which is described in PLT 5 cannot be applied as is to large C content high strength steel sheet.

To apply these arts to large C (carbon) content high strength steel materials, suitable control of the size (average particle size) and presence (density) of the oxides etc. present in the steel sheet is an important requirement. However, strict control to give a particle size and density which are effective as hydrogen trap sites and which do not form starting points of coarse cracks is not technically easy.

CITATIONS LIST

Patent Literature

PLT 1: Japanese Patent Publication No. 10-96031A
PLT 2: Japanese Patent Publication No. 2006-51543A
PLT 3: Japanese Patent Publication No. 2006-9116A
PLT 4: Japanese Patent Publication No. 2005-68548A
PLT 5: WO2008/038474A

SUMMARY OF INVENTION

Technical Problem

Above, the state of the art regarding measures against delayed fracture due to hydrogen embrittlement of hot stamped steel sheet was explained. The problem is that there is at the present point of time no art which suppresses delayed fracture due to hydrogen embrittlement when hot stamping large C content high strength steel sheet.

Therefore, an object of the present invention is to provide steel sheet for hot stamping use which is excellent in part strength after hot stamping and delayed fracture resistance comprised of large C content high strength steel sheet in which strength is secured while effective hydrogen traps are formed in the steel material, a method of production of the same, and a method of production of a hot stamped high strength part.

Solution to Problem

The inventors took note of the fact that, to improve steel sheet for hot stamping use in delayed fracture resistance, trapping the hydrogen which penetrates the steel sheet is effective and engaged in intensive research based on that. As a result, they discovered that it is possible to cause the formation of Fe—Mn-based composite oxides in steel sheet and trap the hydrogen at the interfaces of the composite oxides and the matrix steel and thereby completed the present invention.

In large C content high strength steel sheet, usually the inclusions of metal oxides become defects. For this reason, as much as possible, the oxygen in the steel is removed and formation of metal oxides is suppressed. Therefore, in addition to adding Al and other deoxidizing elements, the concentration of oxygen is reduced at the stage of molten steel.

However, to cause the formation of Fe—Mn-based composite oxides in the steel like in the present invention, it is necessary to leave oxygen in the steel to a certain extent. Further, C itself has a deoxidizing action, so in general, with large C content steel sheet, the oxygen in the steel ends up becoming small in amount.

Therefore, the inventors discovered that by reducing the concentration of Al in the steel sheet, weakening the deoxidizing effect, and securing a concentration of oxygen in the steel, it is possible to cause the formation of composite oxides even in large C content steel sheet.

Further, they discovered that to raise the hydrogen trapping effect of composite oxides, it is effective to crush the composite oxides and increase their surface area. They discovered that by crushing and making the composite oxides finer, their effect as defects falls and this leads to an improvement in the performance of the steel sheet.
Furthermore, they learned that if there are voids around the composite oxides, the hydrogen trapping effect is improved more.

The inventors engaged in intensive studies on the method of production for the above.
They learned that large C content molten steel is high in viscosity, so Fe—Mn-based composite oxides have difficulty rising and steel Fe—Mn-based composite oxides can be easily formed in the steel.

Further, it was learned that by rolling (hot rolling or further cold rolling) a slab comprised of steel in which Fe—Mn composite oxides are formed, the composite oxides can be stretched and crushed. In this way, they discovered that it is possible to efficiently form hydrogen trap sites in steel sheet which do not become starting points of cracks. Further, they discovered that it is possible to form effective voids in a similar process. The present invention was completed based on these discoveries. The present invention has as its gist the following:

(1) Steel sheet for hot stamping use which is comprised of chemical ingredients which contain, by mass %,
C: 0.05 to 0.40%,
Si: 0.001 to 0.02%,
Mn: 0.1 to 3%,
Al: 0.0002 to 0.005%,
Ti: 0.0005 to 0.01%,
O: 0.003 to 0.03%,
one or more of Cr and Mo in a total of 0.005 to 2%, and a balance of Fe and unavoidable impurities,
wherein the steel sheet contains average diameter 0.1 to 15 µm Fe—Mn-based composite oxide particles dispersed in the steel sheet.
Note that, S, P, and N are unavoidable impurities, but are restricted to the following contents:
S: 0.02% or less,
P: 0.03% or less,
N: 0.01% or less,
(2) The steel sheet for hot stamping use as set forth in (1) which further contains, by mass %, the ingredients which are included in one or more groups among the three groups of (a) to (c):
(a) B: 0.0005 to 0.01%;
(b) one or more of Nb, V, W, and Co in a total of 0.005 to 1%; and
(c) one or more of Ni and Cu in a total of 0.005 to 2%.
(3) The steel sheet for hot stamping use as set forth in (1) or (2), wherein there are voids around the composite oxide particles.
(4) The steel sheet for hot stamping use as set forth in (1) or (2), wherein the voids around the composite oxide particles have average sizes of 10 to 100% of the average size of the composite oxide particles.
(5) The steel sheet for hot stamping use as set forth in (1) or (2), wherein the steel sheet is plated by any of aluminum plating, zinc-aluminum plating, and zinc plating.
(6) A method of production of steel sheet for hot stamping use comprising hot rolling a slab of chemical ingredients set forth in (1) or (2) in which rough rolling the slab by a rolling rate of 70% or more and final rolling the slab by a rolling rate of 70% or more.
(7) The method of production of steel sheet for hot stamping use as set forth in (6), further comprising pickling the hot rolled steel sheet which was obtained by hot rolling and cold rolling the steel sheet by a rolling rate of 30% or more.
(8) The method of production of steel sheet for hot stamping use as set forth in (7), further comprising annealing the cold rolled steel sheet which was obtained by cold rolling.
(9) A method of production of a high strength part using the steel sheet for hot stamping use comprising heating the steel sheet as set forth in (1) or (2) to a temperature of austenite region of the $Ac_3$ or higher, then starting to form the steel sheet by a die, and cooling the steel sheet in the die after forming to quench.

Advantageous Effects of Invention

The high strength steel sheet for hot stamping use of the present invention stretches and crushes composite oxides to thereby form composite oxide particles and their surrounding voids which are effective as hydrogen trap sites. Due to this, there is no need to strictly control the size (average particle size) and state of presence (density) of oxides etc. like in the past and it is possible to provide steel sheet which is excellent in delayed fracture characteristics. If using a member which is produced from the steel sheet of the present invention, it is considered possible to greatly contribute to the lighter weight and greater safety of automobiles. The contribution to industry is great.

DESCRIPTION OF EMBODIMENTS

Figure 1:
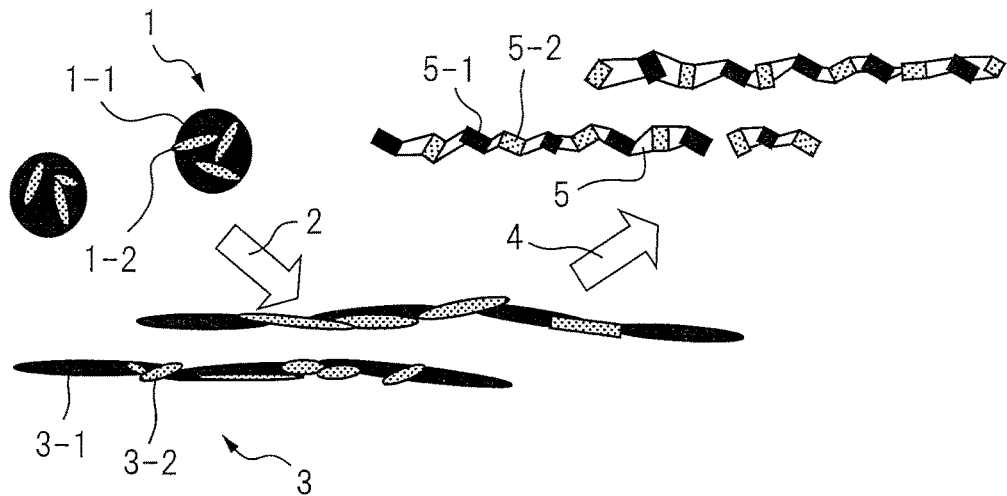
FIG. 1 is a schematic view which shows the state where coarse composite oxides are stretched and crushed and many crushed voids (hydrogen trapping ability) are formed in the steel sheet.

Below, the present invention will be explained in detail.

The fact that delayed fracture occurs due to the diffusible hydrogen which penetrates the steel sheet from the outside environment and diffuses in the steel sheet at room temperature is already known. Therefore, if able to trap hydrogen which penetrates from the outside environment at some part inside the steel sheet, it would become possible to render the hydrogen harmless and delayed fracture would be suppressed.

The inventors discovered that by casting a slab comprised of steel in which Fe—Mn-based composite oxides are formed in the steelmaking process and by hot rolling and cold rolling the slab to stretch and crush the composite oxides, it is possible to form fine voids between the finely crushed Fe—Mn-based composite oxide particles, that the voids are effective as hydrogen trap sites, that diffusible hydrogen, which is believed to be the cause of delayed fracture, is trapped at those parts, and the susceptibility to delayed fracture falls. Furthermore, the inventors discovered that these voids were of sizes and shapes by which they did not easily become starting points of cracks and attempted to apply the steel for a hot stamping material in which strength is demanded.

First, the reasons for limiting the strength of a part after hot stamping of the present invention and the ingredients of steel sheet for hot stamping use which is excellent in delayed fracture resistance to predetermined ranges will be explained. Here, for the ingredients, % means mass %.

C: 0.05 to 0.40%

C is an element which is added to make the structure after cooling martensite and secure the material quality. To improve the strength, 0.05% or more of C is necessary, but if the C content exceeds 0.40%, the strength at the time of deformation upon impact and the weldability deteriorate, so C was made 0.05 to 0.40%. From the viewpoint of the strength, furthermore, the C content is preferably made 0.15% or more, more preferably is made 0.2% or more.

Further, from the viewpoint of the deterioration of the strength at the time of deformation upon impact or the weldability and the effect of deoxidation by C, the C content is preferably 0.35% or less, more preferably 0.3% or less.

Si: 0.001 to 0.02%

Si acts as a deoxidizing element. The present invention requires that a certain amount or more of oxides be secured, so Si, which reduces the oxygen content, is limited to 0.02% or less. To obtain the amount of effective oxides, the Si content is made 0.015% or less, more preferably 0.01% or less. The lower limit of the Si content is not particularly an issue, but due to the time and expense involved in removing Si, 0.001% is made the lower limit.

Mn: 0.1 to 3%

Mn is an element which affects the hot stampability and hardenability and is effective for raising the strength of the steel sheet. Further, Mn, by addition, forms Fe—Mn composite oxides, so is an important ingredient in the present invention. These composite oxides form trap sites for the hydrogen which causes delayed fracture. For this reason, addition of Mn is effective for improvement of the delayed fracture resistance.

Further, the formed composite oxides are fine in size, so are effective for suppressing the formation of coarse cracks at the punched surfaces. To form oxides and utilize Mn to the maximum extent as hydrogen trap sites, it is sufficient to proactively add Mn since addition facilitates control of the oxide composition. If Mn is less than 0.1%, this effect cannot be obtained. For this reason, the Mn content may be made 0.1% or more. To reliably obtain this effect, the Mn content is preferably made 0.5% or more. Furthermore, 1.30% or more is more preferable.

Further, if the Mn content exceeds 3.0%, the Mn assists co-segregation with P and S, invites a drop in the toughness, and lowers the delayed fracture resistance. For this reason, the Mn content should be made 3% or less. More preferably, the Mn content may be made 2.0% or less, more preferably 1.50% or less.

S: 0.02% or less

S is contained as an unavoidable impurity. If contained in excess, it degrades the workability, becomes a cause of deterioration of toughness, and lowers the delayed fracture resistance. For this reason, the smaller the S, the better. As the allowable range, the content is defined as 0.02% or less. Preferably, the content should be made 0.01% or less. Furthermore, by limiting the S content to 0.005% or less, the impact characteristics are strikingly improved.

P: 0.03% or less

P is an element which is contained as an unavoidable impurity and has a detrimental effect on toughness when excessively added. It lowers the delayed fracture resistance. For this reason, the less the P, the better. As the allowable range, the content is limited to 0.03% or less. Furthermore, 0.025% or less is preferable. Furthermore, if 0.02% or less, the effect of improvement of the delayed fracture resistance is large.

Al: 0.0002 to 0.005%

Al is an element which is required for use as a deoxidizing material of molten steel. The present invention requires that a certain amount or more of oxides be secured, so if Al, who has a deoxidizing effect, is over 0.005%, the amount of oxides for improving the delayed fracture resistance cannot be secured. For this reason, the upper limit was made 0.005%. If considering a margin of safety, the Al content is preferably made 0.004% or less, more preferably is made 0.003% or less. Further, the lower limit is not particularly set, but removing Al involves time and expense, so 0.0002% or more is practical.

Ti: 0.0005 to 0.01% or less

Ti is also a deoxidizing element. The lower limit is not particularly set, but removing Ti involves time and expense, so the content is sufficiently made 0.0005% or more, preferably 0.001% or more. On the other hand, addition of a large amount reduces the oxides which improve the delayed fracture resistance, so the upper limit was made 0.01%. Furthermore, 0.008% or less is preferable. Furthermore, if 0.006% or less, the effect of improvement of the delayed fracture resistance is large.

N: 0.01% or less

If N is over 0.01%, the nitrides coarsen and the dissolved N causes hardening upon ageing, whereby a tendency for the toughness to deteriorate is seen. For this reason, the smaller the N the better. As the allowable range of N, the content is limited to 0.01% or less in range. Preferably, it is made 0.008% or less. If 0.006% or less, it is possible to suppress the deterioration of toughness, so this is preferable.

One or both of Cr and Mo in total of 0.005 to 2%

Cr and Mo are both elements which improve the hardenability. Further, they have the effect of causing precipitation of $M_{23}C_6$ type carbides in the matrix and have the action of raising the strength and refining the carbides. For this reason, one or both of Cr and Mo are added in a total of 0.005 to 2%. If less than 0.005%, these effects cannot be sufficiently expected. More preferably, the content should be made 0.01% or more. Furthermore, if 0.05% or more, the effect becomes remarkable. Further, if exceeding 2% in total, the yield strength excessively rises, the toughness is degraded, and the delayed fracture resistance is lowered. If possible, from the viewpoint of the delayed fracture resistance, the content is more preferably made 1.5% or less.

(O: 0.003 to 0.03%)

O is an element which is required for forming Fe—Mn composite oxides in the present invention. Inclusion of 0.003 to 0.03% is necessary. If less than 0.003%, a sufficient amount of Fe—Mn composite oxides cannot be formed. From the viewpoint of forming Fe—Mn composite oxides, 0.005% or more is preferable. On the other hand, if including over 0.03%, the cast slab ends up with blowholes and other internal defects, so the upper limit was made 0.03%. From the viewpoint of internal defects, less is better. An O content of 0.02% or less is preferable. If possible, if 0.015% or less, the defects remarkable decrease.

B: 0.0005 to 0.01%

B is an element which is effective for improving the hardenability. To make this effect more effective, addition of 0.0005% or more is necessary. To make this effect more reliable, 0.001% or more is preferable. Furthermore, 0.0015% or more is more preferable. On the other hand, even if excessively added, the effect becomes saturated, so 0.01% was made the upper limit. Seen from the viewpoint of cost versus effect, 0.008% or less is preferable. If possible, 0.005% or less is more preferable.

One or more of Nb, V, W, and Co in total of 0.005 to 1%

Nb, V, W, and Co are carbide-forming elements. They form precipitates to secure the strength of the hot stamped and quenched member. Furthermore, these are necessary elements which are contained in the Fe—Mn-based composite oxides, act as hydrogen trap sites which are effective for improvement of the delayed fracture resistance, and improve the delayed fracture resistance. One or more of these elements may be added. If the amounts of addition exceed a total of over 1%, the rise in the yield strength excessively increases. For this reason, 0.7% or less is more preferable. If possible, 0.5% or less is still more preferable. On the other hand, if less than 0.005%, the improvement in strength and the effect as a hydrogen trap site become difficult to obtain. From the viewpoint of reliably obtaining this effect, 0.01% or more is preferable.

One or both of Ni and Cu in total of 0.005 to 2%

Ni and Cu are both elements which improve the strength and toughness, but if added in a total of over 2%, the castability falls, so the upper limit is made 2%. From the viewpoint of the castability, the content may be reduced. 1% or less is more preferable. 0.5% or less is more preferable. On the other hand, if less than 0.005% in total, the effect of improvement of the strength and toughness are difficult to obtain, so one or both of Ni and Cu may be added in a total of 0.005% or more. From the viewpoint of the strength and toughness, 0.01% or more is preferable. Furthermore, 0.02% or more is more preferable.

Next, the method of production of steel sheet for hot stamping use which is excellent in delayed fracture resistance of the present invention will be explained.

In the present invention, it is possible to smelt steel adjusted in composition of ingredients of the present invention by the usual smelting, continuous casting, and steel sheet production process. In particular, to form the Fe—Mn-based composite oxides characterizing the present invention, it is preferable to add the weak deoxidizing ability elements first in the steel smelting and casting processes. For example, by adding Mn, Si, Al, etc. in that order, the effect of the present invention can be obtained more remarkably.

The mechanism by which these steelmaking conditions affect the properties of the invention steels is believed to be the following: The fluctuations in composition of the composite oxides of the invention steels are mainly due to the fluctuations in composition of the thermodynamic oxides at the time of melting and solidifying the steels. Basically, this is realized by utilizing the nonequilibrium state in the process of the composition of oxides approaching the equilibrium state due to the change in concentration and change in temperature of the system. By adding a weak oxidation ability element A first, the oxygen in the molten steel forms coarse oxides of A, but by adding an element B with a strong bonding force with oxygen after that, the element A in the oxides of A is switched to the element B. In the process, coarse composite oxides of A and B (A-B composite oxides) are formed. If ending up adding the strong deoxidation ability element first, formation of a composite after that becomes difficult. Not only that, a large amount of oxides are formed together with addition and deoxidation occurs. The large amount of oxides float up in the molten steel make dispersion of oxides into the steel difficult. As a result, the effect of improvement of the delayed fracture resistance of the product is reduced.

Due to such a mechanism, time is required for forming coarse composite oxides after addition of a weak oxidizing element. On the other hand, if an excessively long time ends up elapsing after addition of an element, the composition of the A-B composite oxides becomes too close to the oxides of B in the equilibrium state. Not only does the effect of the composite oxides become smaller, but also the oxides again float up and end up leaving the molten steel so the effect of improvement of the characteristics is inhibited.

The voids which function as hydrogen trap sites are mainly formed in the cold rolling process after hot rolling. That is, the Fe—Mn-based composite oxides are crushed by the rolling whereby crushed voids are formed around the composite oxide particles. For this reason, it is important to control the shape of the composite oxides in the hot rolling process.

In the present invention, the composite oxide parties which are dispersed in the steel were originally an integrated composite oxide. That is, at the time of casting the molten steel finished being adjusted in ingredients, there was a single large oxide mass, but this is believed to be stretched, crushed, and finely dispersed in the rolling process. Such stretching and crushing mainly occurs in the rolling process. When the temperature of the steel sheet is high (1000° C. or more), oxides are mainly stretched.

On the other hand, when the temperature of the steel sheet is low (1000° C. or less), the oxides are mainly crushed. In such a process, if there is segregation in composition in the oxides, the extent of stretching will differ depending on the portion of the oxides and the shape of the oxides will become complicated. Further, the fine (thin) portions are preferentially crushed, while the portions with large fluctuations in shape are expected to be preferentially crushed due to the concentration of deformation stress. As a result, portions which differ in composition are efficiently crushed and dispersed. At the time of this crushing, voids are sometimes formed around the composite oxide particles. These also become hydrogen trap sites in the steel and are believed to remarkably improve the delayed fracture resistance of the hot stamped products.

The above will be explained with reference to the figures.

FIG. 1 is a schematic view which shows the state where coarse composite oxides are stretched and crushed and a large number of crushed voids (hydrogen trapping ability) are formed in the steel sheet. In FIG. 1, the coarse composite oxides 1 are formed by two different types of oxides 1-1 and 1-2 as composites. The composite oxides 1 are hot rough rolled 2 (shown by arrows in FIG. 1) to stretched composite oxides 3 and the oxides 3-1 and 3-2 are also stretched. Next, they are hot final rolled 4 (shown by arrows in FIG. 1) and further stretched and crushed. At this time, oxides of different hardnesses are crushed, so numerous crushed voids 5 are formed around the particles 5-1 and 5-2 of the crushed composite oxides. These crushed voids 5 also become hydrogen trap sites whereby the delayed fracture resistance is improved.

Figure 2:
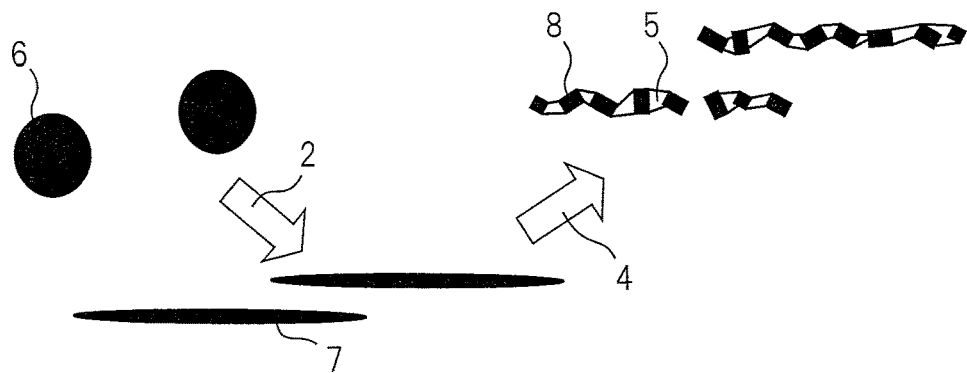
FIG. 2 is a schematic view which shows the state where coarse oxides are stretched and crushed and few crushed voids (hydrogen trapping ability) are formed in the steel sheet.

As opposed to this, the case where, like in the past, just coarse oxides are contained is shown in FIG. 2. The coarse oxides 6 are hot rough rolled 2 (shown by arrows in FIG. 2) to become stretched oxides 7. Next, they are hot final rolled 4 (shown by arrows in FIG. 1) to be stretched and crushed. However, since these are masses of oxides, the crushed oxides 8 also do not disperse as fine composite oxide particles such as in the present invention. Therefore, it is not possible to obtain crushed voids 5 which are sufficient as hydrogen trap sites.

Figure 3:
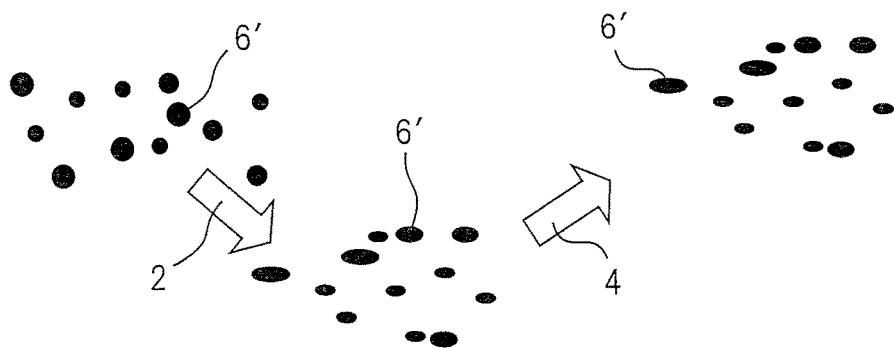
FIG. 3 is a schematic view which shows that crushed voids are not formed when there are fine oxides present.

FIG. 3 is a schematic view which shows that crushed voids are not formed before hot rolling, that is, there are fine oxides at the slab stage. If fine composite oxides 6' at the slab stage such as in FIG. 3, the fine oxides 6' are hard to stretch by rough rolling 2 (shown by arrows in FIG. 3). As a result, even with final rolling 4 (shown by arrows in FIG. 3), the oxides are not crushed that much, so crushed voids 5 which form hydrogen trap sites become difficult to form.

Note that, while not shown, cold rolling, in the same way as hot final rolling 4 (shown by arrows in FIGS. 1 to 3), has the effect of further finely crushing the oxides.

To efficiently trap the hydrogen, it is desirable that the composite oxide particles uniformly disperse in the steel sheet. Further, the interfaces between the composite oxide particles and the matrix steel become hydrogen trap sites, so the composite oxide particles should have large specific surface areas (surface areas per unit weight). For this reason, the composite oxides are desirably fine. Further, from the viewpoint of suppression of defects as well, the composite oxides are desirably fine.

Furthermore, the voids which are formed around the composite oxide particles also become smaller if the composite oxide particles are small. Therefore, from the viewpoint of reducing the volume of voids in the steel sheet as well, the composite oxides preferably become finer. Further, the fact that rolling enables the composite oxides to be stretched, crushed, and made finer is convenient since this is possible with current processes as they are.

The Fe—Mn-based composite oxides which are covered by the present invention are Fe—Mn-based composite oxides comprised of oxides of Fe, Mn, Si, Al, etc. joined together as composites. The composite oxides are preferably fine in size, but if too fine in size, the hydrogen trapping effect is reduced. Therefore, the diameter of the composite oxides is preferably 0.10 µm or more. This is because in oxides which are smaller than this range, the great feature in the characteristics of the steel sheet of the present invention, that is, the effect as hydrogen trap sites becomes extremely small. Preferably, it is 0.50 µm or more, more preferably 1.0 µm or more, still more preferably 2.0 µm or more.

The upper limit of the diameter does not have to be particularly limited if considering the effect of the present invention. However, while depending on the contained oxygen, if the coarse composite oxides become greater, the number density of the composite oxides will decrease and the hydrogen trapping effect will become smaller. Further, too coarse oxides, as is generally known, become starting points of cracking of the steel sheet when working the product sheet and thereby impair the workability. If considering these, the average diameter of the composite oxides is preferably kept to 15 µm or less, preferably 10 µm or less, more preferably 5 µm or less.

The average diameter of the oxides and the voids near the oxides are preferably observed by an optical microscope or scan type electron microscope after polishing a cross-section of the steel sheet. Furthermore, for detailed observation, the steel sheet is preferably used to prepare a thin film sample, then is observed by a transmission type electron microscope. Measurement of the voids is, for example, described in JIS (Japanese Industrial Standard) G0555 "Microscopic Test Methods of Nonmetallic Inclusions of Steel".

Similarly, when crushed voids are formed, their sizes are not particularly limited. The size of a void is a long axis of 0.1 to 5 µm for an aspect ratio of 2 to 10. However, if the crushed voids are too large, void defects result and the characteristics of the steel materials are degraded. Usually, the size is the size of the crushed composite oxides. Therefore, the average size of the crushed voids becomes 100% or less of the average size of the composite oxides (particles). From the viewpoint of the defects, the voids should also be small. Preferably, they should be 80% or less. The lower limit of the average size of voids is not particularly set. Even if the average size is 0, that is, there is no void, hydrogen trap sites are formed by the interfaces of the composite oxides and steel.

The "average size of the voids" in the present invention is defined as the average value of the long axes and short axes of five voids.

Hot rolling, in particular rough rolling is high in temperature, so the composite oxides also soften and the difference in hardness from the matrix iron is also small. That is, in the temperature region of rough rolling, that is, about 1000° C. or more temperature region, there is almost no fracture of composite oxides due to rolling and the composite oxides are stretched.

Further, if lower than 1000° C., preferably 900° C. or less, the composite oxides become difficult to stretch. At the prior stage of hot final rolling, fracture of the extent where fine cracks are formed occur at part of the composite oxides. Furthermore, at the final stage of hot rolling or at cold rolling, the composite oxides are crushed starting from the fine cracks which were formed. To obtain composite oxides which are suitably stretched and simultaneously have fine cracks and are crushed in this way, temperature control at the time of hot rolling and control of the strain and strain rate at different temperature regions becomes necessary.

If the temperature region of the hot working is too high, it is not possible to impart enough strain for forming cracks to the composite oxides. Further, if too low, the composite oxides are not stretched in state, but become close to spherical shapes, so cracks are difficult to form. Suitable stretching and reduction of thickness is necessary for formation of cracks. For this reason, it is necessary to control and impart stretching of the composite oxides by suitable deformation at a higher temperature in hot rolling and formation of cracks in the low temperature region. Further, the form of the composite oxides which form such cracks, as explained above, becomes more complex when there is a difference in concentration inside the composite oxides and a difference in deformation ability. Efficient formation of effective voids becomes possible.

The hot rolling heating temperature and coiling temperature etc. of the hot rolling conditions can be set as usual in the usual operating region. To sufficiently obtain the effect of stretching the composite oxides in hot rolling, the hot rolling heating temperature should be made 1000 to 1400° C. Preferably, it should be made 1050° C. or more. Due to this, hot rough rolling can be performed at 1000° C. or more and, after that, hot final rolling can be performed at 1000° C. or less. The last final rolling temperature should be made 800° C. or less. Preferably, it should be made 750° C. or less. Due to this, the stretched composite oxides are increasingly crushed. Making the coiling temperature 700° C. or less is advantageous economically.

Further, to control the form of the composite oxides, the sheet is preferably rough rolled by a rolling rate of 70% or more and final rolled by a rolling rate of 70% or more. The higher the rolling rate, the more effective in crushing and stretching the composite oxides, so the sheet is more preferably rough rolled by a rolling rate of 75% or more. 80% or more is more preferable. Further, it is still more preferable if the rolling rate in final rolling is 80% or more. 90% or more is more preferable. That is, with this rolling rate, the composite oxides are stretched and crushed and become hydrogen trap sites which are effective for improvement of the delayed fracture resistance.

In hot rolling as well, composite oxide particles which become hydrogen trap sites are obtained, but further cold rolling enables the composite oxides to be made finer and thereby the hydrogen trapping effect to be improved. For the cold rolling to sufficiently crush the composite oxides, the rolling rate in the cold rolling should be made 30% or more. This is because with a 30% or more cold rolling rate, the composite oxides are stretched and crushed to form hydrogen trap sites which are effective for improving the delayed fracture resistance and the delayed fracture resistance is further improved. Furthermore, 40% or more is more preferable, while if 50% or more, the improvement in the delayed fracture resistance becomes remarkable. In particular, when deep drawing becomes necessary, it is preferable to make the rolling rate in cold rolling 60% or more.

In the case of annealing, either the continuous annealing method or the box annealing method which is performed on ordinary cold rolled steel sheet may be used.

When the steel sheet for hot stamping use is used as a structural part for an automobile, it is mostly used treated on its surface. In particular, it is mostly used as plated steel sheet. As plated steel sheet, usually aluminum plated, zinc-aluminum plated, and zinc plated sheet are used. The steel sheet for hot stamping use of the present invention may also be plated by ordinary methods. For example, when applying hot dip aluminum coating, the surface of the steel sheet should be coated by 30 to 100 $g/m^2$ or so at one side.

Further, to produce a high strength part by hot stamping in the present invention, the steel sheet is first heated in the austenite region, that is, to the $Ac_3$ transformation point or higher austenite region. In this case, it is sufficient that the austenite region be reached. If too high, coarsening of the particles or oxidation will become remarkable, so this is not preferred. Next, the sheet starts to be shaped by the die set. By constraining the part after being worked by the die set while rapidly cooling it and causing martensite transformation for quenching, it is possible to produce a high strength part.

If the cooling rate becomes slow, quenching is no longer achieved and the target strength can no longer be obtained, so the speed of rapid cooling from the austenite region is made the critical cooling rate which is affected by the steel ingredients or structure or more. The cooling completion temperature is preferably the martensite transformation completion temperature or less.

Note that, tempering need not particularly be performed, but may be performed in accordance with need for correcting too high strength or improving the toughness.

EXAMPLES

Below, examples will be used to explain the present invention.

Example 1

Steels of the chemical ingredients which are shown in Tables 1-1 to 1-3 and Tables 2-1 to 2-3 were cast to produce slabs. Note that, Tables 2-1 to 2-3 show steel types which have the Steel Types A, X, and AC which are described in Table 1-1 and Table 1-2 as base steels and have different ingredient elements which are described in Tables 2-1 to 2-3 mixed in with them.

These slabs were heated to 1050 to 1350° C. and hot rolled at a finish temperature 800 to 900° C. and a coiling temperature 450 to 680° C. to obtain thickness 4 mm hot rolled steel sheets. After that, the sheets were pickled, then were cold rolled to obtain thickness 1.6 mm cold rolled steel sheet. After that, they were continuously annealing (annealing temperature 720 to 830° C.). Further, parts of the cold rolled steel sheets were hot dip galvanized (basis weight: one side 30 to 90 $g/m^2$), hot dip galvannealed (basis weight: one side 30 to 90 $g/m^2$), and hot dip aluminum coated (basis weight: one side 30 to 100 g/m$^2$) on a continuous hot dipping line. The steel sheet types are shown in Tables 1-1 to 3 and 2-1 to 3. The types of steel sheets are shown below:
HR: hot rolled steel sheet, CR: cold rolled steel sheet (annealed material), AL: hot dip aluminum coated steel sheet, GI: hot dip galvanized steel sheet, and GA: hot dip galvannealed steel sheet.

The average (arithmetic average) particle size of the Fe—Mn composite oxides in a produced steel sheet and the presence of crushed voids were determined by polishing a cross-section of the steel sheet, then observing it by an optical microscope or scan type electron microscope or by a transmission type electron microscope after preparing the sample into a thin film. The results are shown together in Tables 1-1 to 3 and Tables 2-1 to 2-3. The judgment criteria are shown below:
Average particle size of composite oxides:
Good: average diameter 0.1 to 15 μm,
Poor: average diameter less than 0.1 μm or over 15 μm
An average diameter of the composite oxides, as explained above, of 0.1 to 15 μm was deemed as passing.
Crush voids around composite oxides:
Good: average size of voids 0.1 μm or more,
Poor: average size of voids less than 0.1 μm.
The average size of the crushed voids around the composite oxides, as explained above, is preferably 0.1 μm or more.

After that, these cold rolled steel sheets were heated by a heating furnace to over the Ac3 point, that is, the 880 to 950° C. austenite region, then were hot worked. For the atmosphere of the heating furnace, combustion exhaust gas was used. The hydrogen concentration in the atmosphere was 2%, while the dew-point was 20° C.

Figure 4:
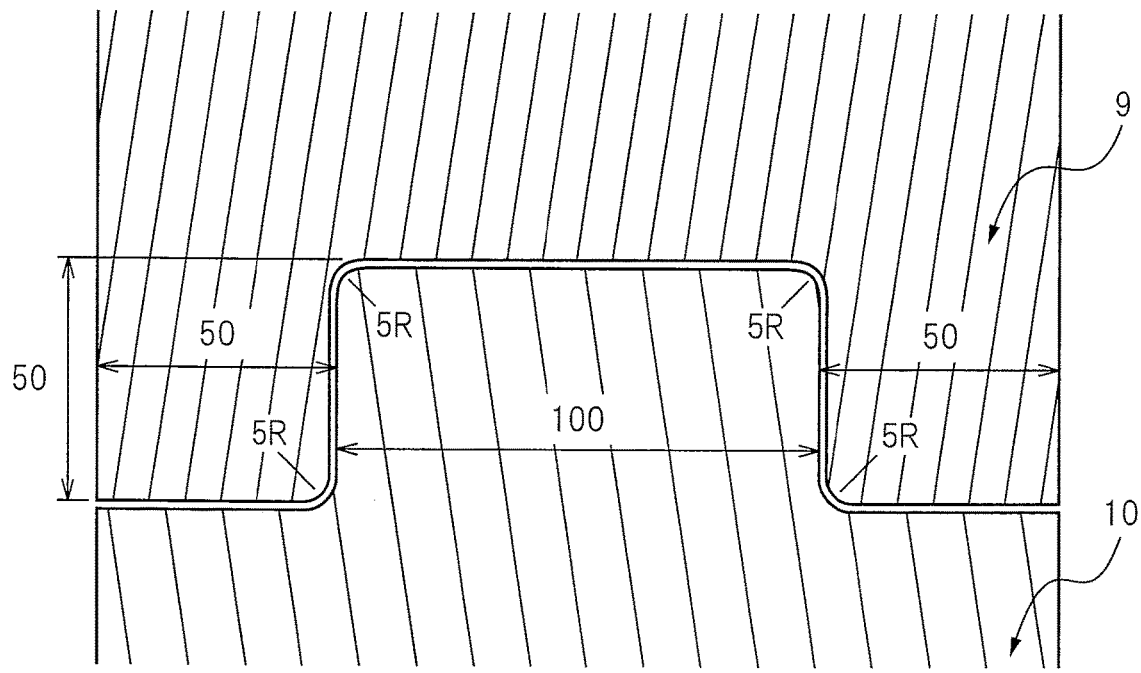
FIG. 4 is a cross-sectional view of the shape of a die set which is used in the examples.
Figure 5:
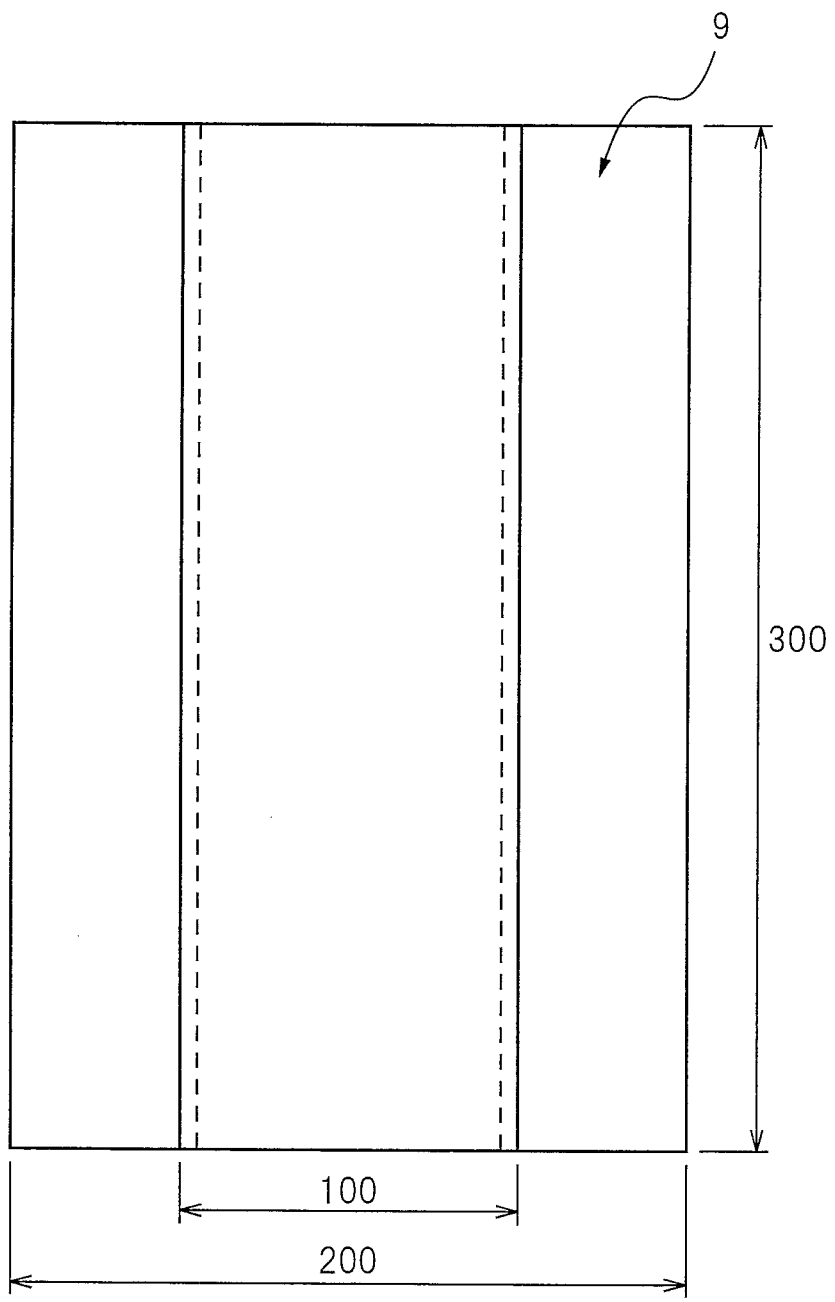
FIG. 5 is a view which shows the shape of a punch which is used in the examples as seen from the top.
Figure 6:
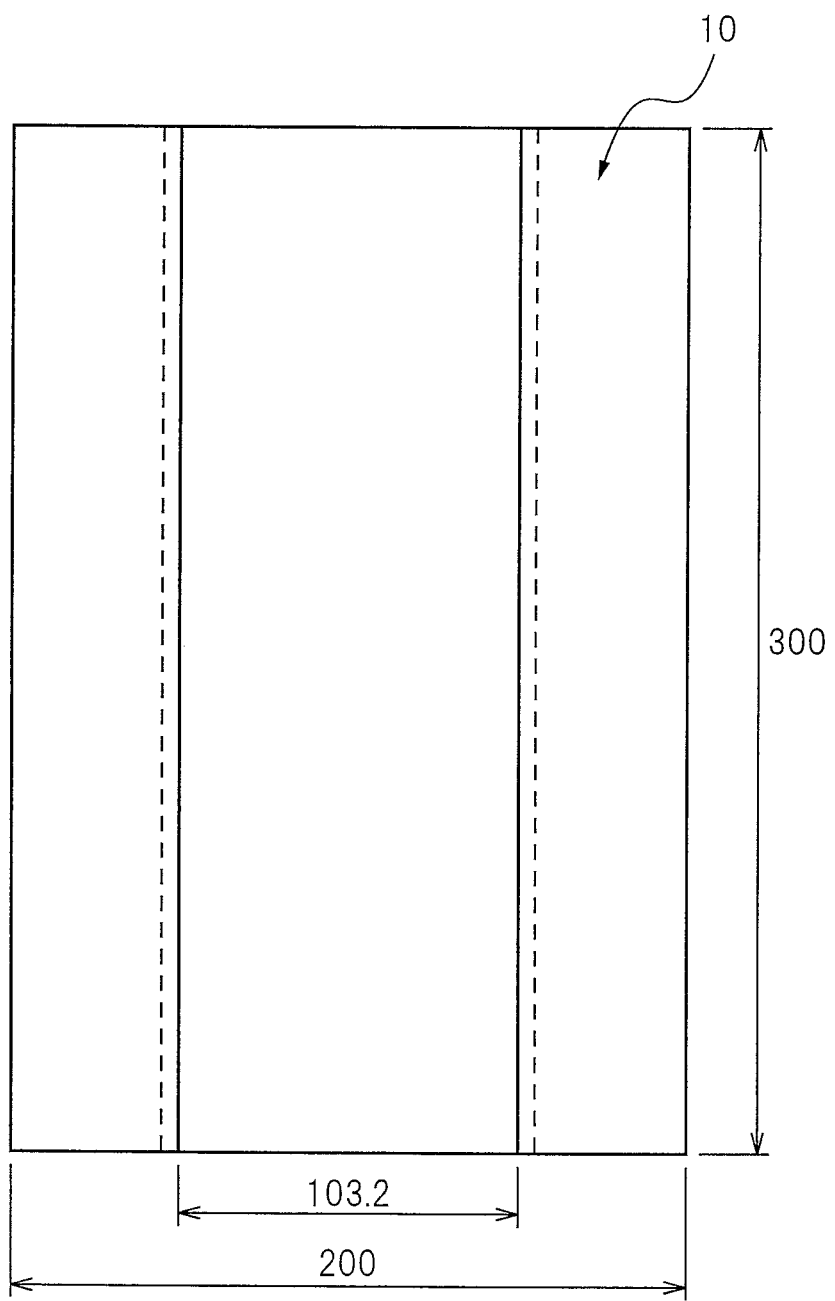
FIG. 6 is a view which shows the shape of a die which is used in the examples as seen from the bottom.
Figure 7:
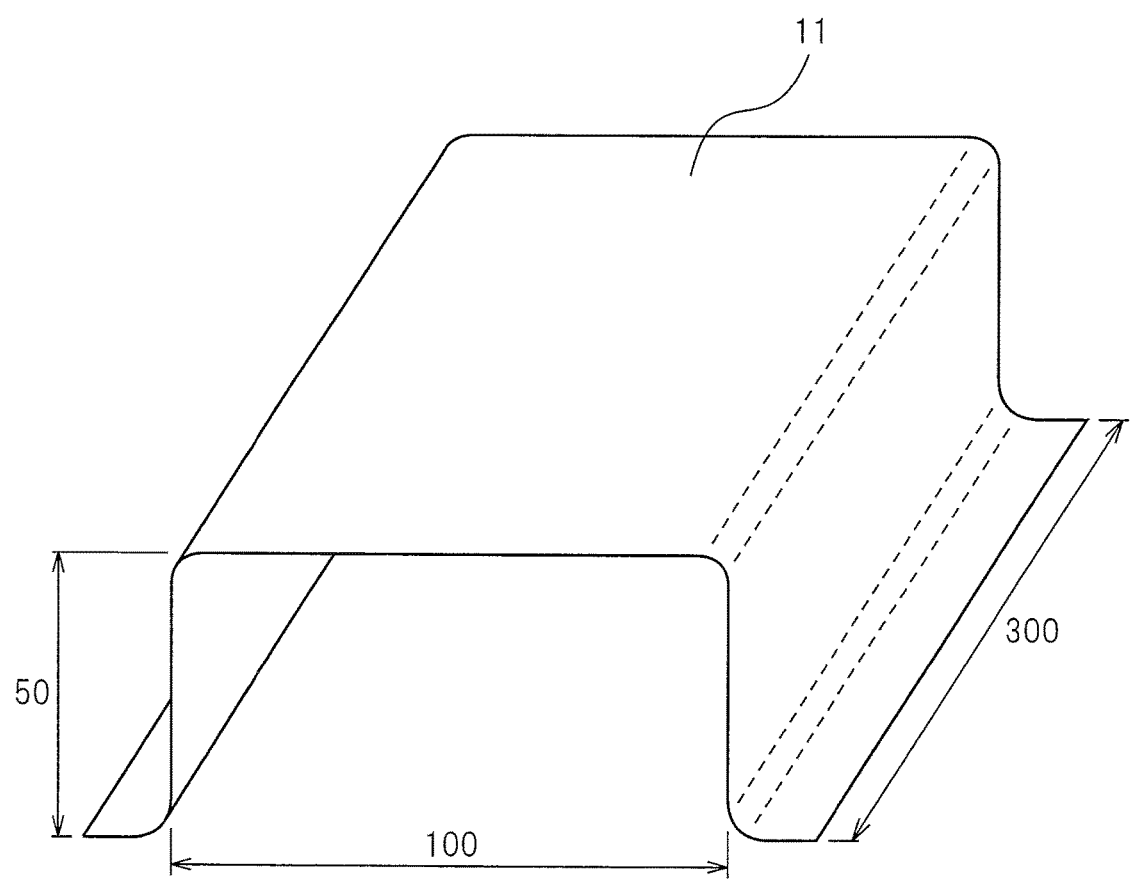
FIG. 7 is a schematic view of a hot stamped part.

A cross-section of the die set shape is shown in FIG. 4. FIG. 4 shows the shapes of a die 9 and punch 10. The shape of the punch when seen from above is shown in FIG. 5. FIG. 5 shows the punch 10. The shape of the die when seen from below is shown in FIG. 6. FIG. 6 shows the die 9. In the die set, the shape of the die is determined based on the punch with a clearance of the sheet thickness of 1.6 mm. The blank size was made 1.6 mm thickness×300 mm×500 mm. The shaping conditions were made a punch speed of 10 mm/s, a pressing force of 200 tons, and a holding time at bottom dead center of 5 seconds. A schematic view of the hot stamped part 11 is shown in FIG. 7.

The quenching characteristic of the hot stamped part was evaluated by polishing the cross-section, corroding it by Nital, then observing the microstructure by an optical microscope and determining the area rate of martensite. The results of judgment are shown in Tables 1-1 to 1-3 and Tables 2-1 to 2-3. The judgment criteria are shown below:
Good: martensite area rate 90% or more,
Fair: martensite area rate 80% or more, and
Poor: martensite area rate less than 80%.
A martensite area rate of 80% or more was deemed the preferable range.

Figure 8:
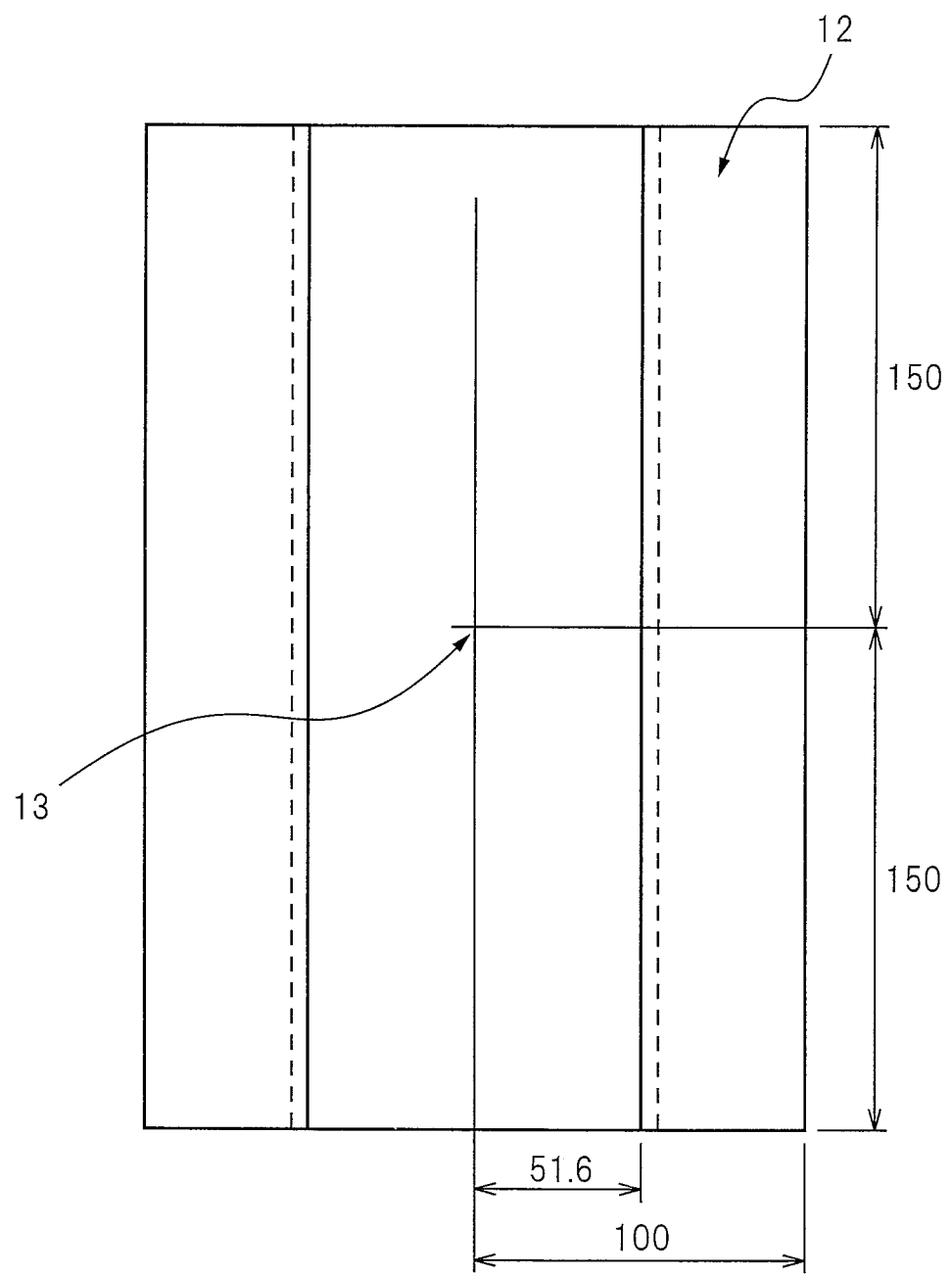
FIG. 8 is a view which shows the shape of a test part for evaluation of delayed fracture resistance as seen from the top.

The delayed fracture resistance was evaluated by imparting stress by piercing. The pierce hole position 13 at the center of the test part 12 which is shown in FIG. 8 was pierced using a diameter 10 mm punch and using a diameter 10.5 mm die. FIG. 8 shows the shape of the part seen from above. FIG. 8 shows the part 12 and the pierce whole center 13. The piercing was performed within 30 minutes after hot shaping. The number of parts observed was 10. For judgment of the hydrogen embrittlement resistance, the entire circumference of the hole was observed one week after piercing to judge the presence of any cracks. The state was observed by a loupe or electron microscope. The results of judgment are shown in Tables 3. The judgment criteria are shown below:
Total of number of parts with fine cracks in 10 parts:
Very good: 0,
Good: 1,
Fair: less than 5,
Poor: 5 or more.
A number of parts with fine cracks of less than five was judged as passing, but of course the smaller the number the better.

As shown in Tables 1-1 to 1-3 and Tables 2-1 to 2-3, if in the scope of the present invention, it is learned that it is possible to realize steel sheet which is sufficiently strengthened by die quenching by hot stamping and is excellent in delayed fracture resistance.

TABLE 1-1

| | | | (mass %) | | | | | | | | |
|---|---|---|---|---|---|---|---|---|---|---|---|
| Exp. no. | Steel type | Steel sheet type | C | Si | Mn | P | S | Al | Ti | N | Cr | Mo |
| 1-1 | A | HR | 0.22 | 0.005 | 1.2 | 0.01 | 0.002 | 0.003 | 0.004 | 0.003 | 1 | 0.2 |
| 2-1 | B | HR | 0.05 | 0.005 | 1.5 | 0.01 | 0.002 | 0.003 | 0.004 | 0.003 | 1 | 0.2 |
| 3-1 | C | HR | 0.03 | 0.005 | 1.7 | 0.01 | 0.002 | 0.003 | 0.004 | 0.003 | 1 | 0.2 |
| 4-1 | D | HR | 0.40 | 0.005 | 1 | 0.01 | 0.002 | 0.003 | 0.004 | 0.003 | 1 | 0.2 |
| 1 | A | CR | 0.22 | 0.005 | 1.2 | 0.01 | 0.002 | 0.003 | 0.004 | 0.003 | 1 | 0.2 |
| 2 | B | CR | 0.05 | 0.005 | 1.5 | 0.01 | 0.002 | 0.003 | 0.004 | 0.003 | 1 | 0.2 |
| 3 | C | CR | 0.03 | 0.005 | 1.7 | 0.01 | 0.002 | 0.003 | 0.004 | 0.003 | 1 | 0.2 |
| 4 | D | CR | 0.40 | 0.005 | 1 | 0.01 | 0.002 | 0.003 | 0.004 | 0.003 | 1 | 0.2 |
| 5 | A | AL | 0.22 | 0.005 | 1.2 | 0.01 | 0.002 | 0.003 | 0.004 | 0.003 | 1 | 0.2 |
| 6 | B | AL | 0.05 | 0.005 | 1.5 | 0.01 | 0.002 | 0.003 | 0.004 | 0.003 | 1 | 0.2 |
| 7 | C | AL | 0.03 | 0.005 | 1.7 | 0.01 | 0.002 | 0.003 | 0.004 | 0.003 | 1 | 0.2 |
| 8 | D | AL | 0.40 | 0.005 | 1 | 0.01 | 0.002 | 0.003 | 0.004 | 0.003 | 1 | 0.2 |
| 9 | A | GI | 0.22 | 0.005 | 1.2 | 0.01 | 0.002 | 0.003 | 0.004 | 0.003 | 1 | 0.2 |
| 10 | B | GI | 0.05 | 0.005 | 1.5 | 0.01 | 0.002 | 0.003 | 0.004 | 0.003 | 1 | 0.2 |
| 11 | C | GI | 0.03 | 0.005 | 1.7 | 0.01 | 0.002 | 0.003 | 0.004 | 0.003 | 1 | 0.2 |
| 12 | D | GI | 0.40 | 0.005 | 1 | 0.01 | 0.002 | 0.003 | 0.004 | 0.003 | 1 | 0.2 |
| 13 | A | GA | 0.22 | 0.005 | 1.2 | 0.01 | 0.002 | 0.003 | 0.004 | 0.003 | 1 | 0.2 |
| 14 | B | GA | 0.05 | 0.005 | 1.5 | 0.01 | 0.002 | 0.003 | 0.004 | 0.003 | 1 | 0.2 |
| 15 | C | GA | 0.03 | 0.005 | 1.7 | 0.01 | 0.002 | 0.003 | 0.004 | 0.003 | 1 | 0.2 |
| 16 | D | GA | 0.40 | 0.005 | 1 | 0.01 | 0.002 | 0.003 | 0.004 | 0.003 | 1 | 0.2 |
| 17 | E | GA | 0.55 | 0.005 | 0.8 | 0.01 | 0.002 | 0.003 | 0.004 | 0.003 | 1 | 0.2 |
| 18 | F | CR | 0.22 | 0.05 | 1.2 | 0.01 | 0.002 | 0.003 | 0.004 | 0.003 | 1 | 0.2 |

TABLE 1-1-continued (mass %)

| | | | | | | | | | | | |
|---|---|---|---|---|---|---|---|---|---|---|---|
| 19 | G | CR | 0.22 | 0.005 | 3.0 | 0.01 | 0.002 | 0.003 | 0.004 | 0.003 | 0.005 |
| 20 | H | CR | 0.22 | 0.005 | 0.05 | 0.01 | 0.002 | 0.003 | 0.004 | 0.003 | 0.01 |
| 21 | I | CR | 0.22 | 0.005 | 3.6 | 0.01 | 0.002 | 0.003 | 0.004 | 0.003 | 0.01 |
| 22 | J | CR | 0.22 | 0.005 | 1.2 | 0.01 | 0.015 | 0.003 | 0.004 | 0.003 | 1 | 0.2 |
| 23 | K | CR | 0.22 | 0.005 | 1.2 | 0.01 | 0.024 | 0.003 | 0.004 | 0.003 | 1 | 0.2 |
| 24 | L | CR | 0.22 | 0.005 | 1.2 | 0.025 | 0.002 | 0.003 | 0.004 | 0.003 | 1 | 0.2 |
| 25 | M | CR | 0.22 | 0.005 | 1.2 | 0.035 | 0.002 | 0.003 | 0.004 | 0.003 | 1 | 0.2 |
| 26 | N | CR | 0.22 | 0.005 | 1.2 | 0.01 | 0.002 | 0.001 | 0.004 | 0.003 | 1 | 0.2 |
| 27 | O | CR | 0.22 | 0.005 | 1.2 | 0.01 | 0.002 | 0.04 | 0.004 | 0.003 | 1 | 0.2 |

| Exp. no. | Cr + Mo | O | B | Martensite area rate | Delayed fracture characteristic | Oxide average particle size | Crushed voids | Class |
|---|---|---|---|---|---|---|---|---|
| 1-1 | 1.2 | 0.015 | | G | VG | G | G | Inv. ex. |
| 2-1 | 1.2 | 0.0162 | | G | VG | G | G | Inv. ex. |
| 3-1 | 1.2 | 0.0245 | | x | VG | G | G | Comp. ex. |
| 4-1 | 1.2 | 0.0104 | | G | G | G | G | Inv. ex. |
| 1 | 1.2 | 0.015 | | G | VG | G | G | Inv. ex. |
| 2 | 1.2 | 0.0162 | | G | VG | G | G | Inv. ex. |
| 3 | 1.2 | 0.0245 | | x | VG | G | G | Comp. ex. |
| 4 | 1.2 | 0.0104 | | G | G | G | G | Inv. ex. |
| 5 | 1.2 | 0.015 | | G | VG | G | G | Inv. ex. |
| 6 | 1.2 | 0.0162 | | G | VG | G | G | Inv. ex. |
| 7 | 1.2 | 0.0245 | | x | VG | G | G | Comp. ex. |
| 8 | 1.2 | 0.0104 | | G | G | G | G | Inv. ex. |
| 9 | 1.2 | 0.015 | | G | VG | G | G | Inv. ex. |
| 10 | 1.2 | 0.0162 | | G | VG | G | G | Inv. ex. |
| 11 | 1.2 | 0.0245 | | P | VG | G | G | Comp. ex. |
| 12 | 1.2 | 0.0104 | | G | G | G | G | Inv. ex. |
| 13 | 1.2 | 0.015 | | G | VG | G | G | Inv. ex. |
| 14 | 1.2 | 0.0162 | | G | VG | G | G | Inv. ex. |
| 15 | 1.2 | 0.0245 | | P | VG | G | G | Comp. ex. |
| 16 | 1.2 | 0.0104 | | G | G | G | G | Inv. ex. |
| 17 | 1.2 | 0.0025 | | G | P | P | — | Comp. ex. |
| 18 | 1.2 | 0.0023 | | G | P | P | — | Comp. ex. |
| 19 | 0.005 | 0.0149 | | G | VG | G | G | Inv. ex. |
| 20 | 0.01 | 0.0153 | | P | P | — | — | Comp. ex. |
| 21 | 0.01 | 0.0151 | | G | P | G | G | Comp. ex. |
| 22 | 1.2 | 0.0013 | | G | P | P | — | Comp. ex. |
| 23 | 1.2 | 0.0013 | | G | P | P | — | Comp. ex. |
| 24 | 1.2 | 0.015 | | G | G | G | G | Inv. ex. |
| 25 | 1.2 | 0.015 | | G | F | G | G | Inv. ex. |
| 26 | 1.2 | 0.0161 | | G | VG | G | G | Inv. ex. |
| 27 | 1.2 | 0.0022 | | G | P | P | — | Comp. ex. |

TABLE 1-2

| Ex. no. | Steel type | Steel sheet type | C | Si | Mn | P | S | Al | Ti | N | Cr | Mo | Cr + Mo |
|---|---|---|---|---|---|---|---|---|---|---|---|---|---|
| 28 | P | CR | 0.22 | 0.005 | 1.2 | 0.01 | 0.002 | 0.003 | 0.001 | 0.003 | 1 | 0.2 | 1.2 |
| 29 | Q | CR | 0.22 | 0.005 | 1.2 | 0.01 | 0.002 | 0.003 | 0.04 | 0.003 | 1 | 0.2 | 1.2 |
| 30 | R | CR | 0.22 | 0.005 | 2 | 0.01 | 0.002 | 0.003 | 0.004 | 0.003 | | 0.005 | 0.005 |
| 31 | S | CR | 0.22 | 0.005 | 1.8 | 0.01 | 0.002 | 0.003 | 0.004 | 0.003 | | 0.08 | 0.08 |
| 32 | T | CR | 0.22 | 0.005 | 1.8 | 0.01 | 0.002 | 0.003 | 0.004 | 0.003 | 0.1 | 0 | 0.1 |
| 33 | U | CR | 0.22 | 0.005 | 1.3 | 0.01 | 0.002 | 0.003 | 0.004 | 0.003 | 0.8 | 0 | 0.8 |
| 34 | V | CR | 0.22 | 0.005 | 0.2 | 0.01 | 0.002 | 0.003 | 0.004 | 0.003 | 0 | 3 | 3 |
| 35 | W | CR | 0.22 | 0.005 | 1.2 | 0.01 | 0.002 | 0.003 | 0.004 | 0.003 | 2.5 | 0 | 2.5 |
| 36 | X | CR | 0.22 | 0.005 | 1.3 | 0.01 | 0.002 | 0.003 | 0.004 | 0.003 | | 0.2 | 0.2 |
| 37 | Y | CR | 0.15 | 0.005 | 1.5 | 0.01 | 0.002 | 0.003 | 0.004 | 0.003 | | 0.2 | 0.2 |
| 38 | Z | CR | 0.10 | 0.005 | 1.7 | 0.01 | 0.002 | 0.003 | 0.004 | 0.003 | | 0.2 | 0.2 |
| 39 | AA | CR | 0.03 | 0.005 | 1.8 | 0.01 | 0.002 | 0.003 | 0.004 | 0.003 | | 0.2 | 0.2 |
| 40 | AB | CR | 0.25 | 0.005 | 1.2 | 0.01 | 0.002 | 0.003 | 0.004 | 0.003 | | 0.2 | 0.2 |
| 41 | AC | CR | 0.30 | 0.005 | 1 | 0.01 | 0.002 | 0.003 | 0.004 | 0.003 | | 0.2 | 0.2 |
| 42 | AD | CR | 0.55 | 0.005 | 0.4 | 0.01 | 0.002 | 0.003 | 0.004 | 0.003 | | 0.2 | 0.2 |
| 43 | Y | AL | 0.15 | 0.005 | 1.5 | 0.01 | 0.002 | 0.003 | 0.004 | 0.003 | | 0.2 | 0.2 |
| 44 | Z | AL | 0.10 | 0.005 | 1.7 | 0.01 | 0.002 | 0.003 | 0.004 | 0.003 | | 0.2 | 0.2 |
| 45 | AA | AL | 0.03 | 0.005 | 1.8 | 0.01 | 0.002 | 0.003 | 0.004 | 0.003 | | 0.2 | 0.2 |
| 46 | AB | AL | 0.25 | 0.005 | 1.2 | 0.01 | 0.002 | 0.003 | 0.004 | 0.003 | | 0.2 | 0.2 |
| 47 | AC | AL | 0.30 | 0.005 | 1 | 0.01 | 0.002 | 0.003 | 0.004 | 0.003 | | 0.2 | 0.2 |
| 48 | AD | AL | 0.55 | 0.005 | 0.4 | 0.01 | 0.002 | 0.003 | 0.004 | 0.003 | | 0.2 | 0.2 |
| 49 | Y | GI | 0.15 | 0.005 | 1.5 | 0.01 | 0.002 | 0.003 | 0.004 | 0.003 | | 0.2 | 0.2 |

TABLE 1-2-continued

| Ex. no. | Steel type | Steel sheet type | C | Si | Mn | P | S | Al | Ti | N | Cr | Mo |
|---|---|---|---|---|---|---|---|---|---|---|---|---|
| 50 | Z | GI | 0.10 | 0.005 | 1.7 | 0.01 | 0.002 | 0.003 | 0.004 | 0.003 | 0.2 | 0.2 |
| 51 | AA | GI | 0.03 | 0.005 | 1.8 | 0.01 | 0.002 | 0.003 | 0.004 | 0.003 | 0.2 | 0.2 |
| 52 | AB | GI | 0.25 | 0.005 | 1.2 | 0.01 | 0.002 | 0.003 | 0.004 | 0.003 | 0.2 | 0.2 |
| 53 | AC | GI | 0.30 | 0.005 | 1 | 0.01 | 0.002 | 0.003 | 0.004 | 0.003 | 0.2 | 0.2 |
| 54 | AD | GI | 0.55 | 0.005 | 0.4 | 0.01 | 0.002 | 0.003 | 0.004 | 0.003 | 0.2 | 0.2 |
| 55 | Y | GA | 0.15 | 0.005 | 1.5 | 0.01 | 0.002 | 0.003 | 0.004 | 0.003 | 0.2 | 0.2 |
| 56 | Z | GA | 0.10 | 0.005 | 1.7 | 0.01 | 0.002 | 0.003 | 0.004 | 0.003 | 0.2 | 0.2 |

| Ex. no. | O | B | Martensite area rate | Delayed fracture characteristic | Oxide average particle size | Crushed voids | Class |
|---|---|---|---|---|---|---|---|
| 28 | 0.03 | | | G | VG | G | G | Inv. ex. |
| 29 | 0.0013 | | G | P | P | — | Comp. ex. |
| 30 | 0.0149 | | F | VG | G | G | Inv. ex. |
| 31 | 0.0153 | | F | VG | G | G | Inv. ex. |
| 32 | 0.0148 | | F | VG | G | G | Inv. ex. |
| 33 | 0.0145 | | F | VG | G | G | Inv. ex. |
| 34 | 0.0154 | | G | P | G | G | Comp. ex. |
| 35 | 0.015 | | G | P | G | G | Comp. ex. |
| 36 | 0.0163 | 0.0048 | G | VG | G | G | Inv. ex. |
| 37 | 0.0183 | 0.0052 | G | VG | G | G | Inv. ex. |
| 38 | 0.0193 | 0.0048 | G | VG | G | G | Inv. ex. |
| 39 | 0.0233 | 0.0048 | P | VG | G | G | Comp. ex. |
| 40 | 0.0134 | 0.0045 | G | VG | G | G | Inv. ex. |
| 41 | 0.0121 | 0.0054 | G | VG | G | G | Inv. ex. |
| 42 | 0.0025 | 0.0043 | G | P | P | — | Comp. ex. |
| 43 | 0.0183 | 0.0052 | G | VG | G | G | Inv. ex. |
| 44 | 0.0193 | 0.0048 | G | VG | G | G | Inv. ex. |
| 45 | 0.0233 | 0.0048 | P | VG | G | G | Comp. ex. |
| 46 | 0.0134 | 0.0045 | G | VG | G | G | Inv. ex. |
| 47 | 0.0121 | 0.0054 | G | VG | G | G | Inv. ex. |
| 48 | 0.0025 | 0.0043 | G | P | P | — | Comp. ex. |
| 49 | 0.0183 | 0.0052 | G | VG | G | G | Inv. ex. |
| 50 | 0.0193 | 0.0048 | G | VG | G | G | Inv. ex. |
| 51 | 0.0233 | 0.0048 | P | VG | G | G | Comp. ex. |
| 52 | 0.0134 | 0.0045 | G | VG | G | G | Inv. ex. |
| 53 | 0.0121 | 0.0054 | G | VG | G | G | Inv. ex. |
| 54 | 0.0025 | 0.0043 | G | P | P | — | Comp. ex. |
| 55 | 0.0183 | 0.0052 | G | VG | G | G | Inv. ex. |
| 56 | 0.0193 | 0.0048 | G | VG | G | G | Inv. ex. |

TABLE 1-3

| Ex. no. | Steel type | Steel sheet type | C | Si | Mn | P | S | Al | Ti | N | Cr | Mo |
|---|---|---|---|---|---|---|---|---|---|---|---|---|
| 57 | AA | GA | 0.03 | 0.005 | 1.8 | 0.01 | 0.002 | 0.003 | 0.004 | 0.003 | 0.2 | |
| 58 | AB | GA | 0.25 | 0.005 | 1.2 | 0.01 | 0.002 | 0.003 | 0.004 | 0.003 | 0.2 | |
| 59 | AC | GA | 0.30 | 0.005 | 1 | 0.01 | 0.002 | 0.003 | 0.004 | 0.003 | 0.2 | |
| 60 | AD | GA | 0.55 | 0.005 | 0.4 | 0.01 | 0.002 | 0.003 | 0.004 | 0.003 | 0.2 | |
| 61 | AE | CR | 0.22 | 0.001 | 1.3 | 0.01 | 0.002 | 0.003 | 0.004 | 0.003 | 0.2 | |
| 62 | AF | CR | 0.22 | 0.007 | 1.3 | 0.01 | 0.002 | 0.003 | 0.004 | 0.003 | 0.2 | |
| 63 | AG | CR | 0.22 | 0.014 | 1.3 | 0.01 | 0.002 | 0.003 | 0.004 | 0.003 | 0.2 | |
| 63-1 | AG2 | CR | 0.22 | 0.02 | 1.3 | 0.01 | 0.002 | 0.003 | 0.004 | 0.003 | 0.2 | |
| 64 | AH | CR | 0.22 | 0.023 | 1.3 | 0.01 | 0.002 | 0.003 | 0.004 | 0.003 | 0.2 | |
| 65 | AI | CR | 0.22 | 0.005 | 0.03 | 0.01 | 0.002 | 0.003 | 0.004 | 0.003 | 0.2 | |
| 65-1 | AI2 | CR | 0.22 | 0.005 | 0.1 | 0.01 | 0.002 | 0.003 | 0.004 | 0.003 | 0.2 | |
| 66 | AJ | CR | 0.22 | 0.005 | 3.3 | 0.01 | 0.002 | 0.003 | 0.004 | 0.003 | 0.2 | |
| 67 | AK | CR | 0.22 | 0.005 | 1.3 | 0.01 | 0.002 | 0.003 | 0.004 | 0.003 | 0.2 | |
| 68 | AL | CR | 0.22 | 0.005 | 1.3 | 0.01 | 0.013 | 0.003 | 0.004 | 0.003 | 0.2 | |
| 69 | AM | CR | 0.22 | 0.005 | 1.3 | 0.01 | 0.032 | 0.003 | 0.004 | 0.003 | 0.2 | |
| 70 | AN | CR | 0.22 | 0.005 | 1.3 | 0.025 | 0.002 | 0.003 | 0.004 | 0.003 | 0.2 | |
| 71 | AO | CR | 0.22 | 0.005 | 1.3 | 0.035 | 0.002 | 0.003 | 0.004 | 0.003 | 0.2 | |
| 72 | AP | CR | 0.22 | 0.005 | 1.3 | 0.01 | 0.002 | 0.0002 | 0.004 | 0.003 | 0.2 | |
| 73 | AQ | CR | 0.22 | 0.005 | 1.3 | 0.01 | 0.002 | 0.0012 | 0.004 | 0.003 | 0.2 | |
| 74 | AR | CR | 0.22 | 0.005 | 1.3 | 0.01 | 0.002 | 0.005 | 0.004 | 0.003 | 0.2 | |
| 75 | AS | CR | 0.22 | 0.005 | 1.3 | 0.01 | 0.002 | 0.0073 | 0.004 | 0.003 | 0.2 | |
| 76 | AT | CR | 0.22 | 0.005 | 1.3 | 0.01 | 0.002 | 0.003 | 0.0005 | 0.003 | 0.2 | |
| 77 | AU | CR | 0.22 | 0.005 | 1.3 | 0.01 | 0.002 | 0.003 | 0.001 | 0.003 | 0.2 | |
| 78 | AV | CR | 0.22 | 0.005 | 1.3 | 0.01 | 0.002 | 0.003 | 0.01 | 0.003 | 0.2 | |
| 79 | AW | CR | 0.22 | 0.005 | 1.3 | 0.01 | 0.002 | 0.003 | 0.023 | 0.003 | 0.2 | |
| 80 | AX | CR | 0.22 | 0.005 | 1.3 | 0.01 | 0.002 | 0.003 | 0.004 | 0.003 | 0.008 | 0.07 |
| 81 | AY | CR | 0.22 | 0.005 | 1.3 | 0.01 | 0.002 | 0.003 | 0.004 | 0.003 | 0.02 | 0.1 |
| 82 | AZ | CR | 0.22 | 0.005 | 0.5 | 0.01 | 0.002 | 0.003 | 0.004 | 0.003 | 1.2 | |

TABLE 1-3-continued

| | | | | | | | | | | | | |
|---|---|---|---|---|---|---|---|---|---|---|---|---|
| 83 | BA | CR | 0.22 | 0.005 | 0.3 | 0.01 | 0.002 | 0.003 | 0.004 | 0.003 | 0.7 | 0.3 |
| 84 | BB | CR | 0.22 | 0.005 | 0.5 | 0.01 | 0.002 | 0.003 | 0.004 | 0.003 | 0.02 | 2.2 |
| 85 | BC | CR | 0.22 | 0.005 | 0.5 | 0.01 | 0.002 | 0.003 | 0.004 | 0.003 | 1.7 | 0.3 |
| 86 | BD | CR | 0.22 | 0.005 | 1.3 | 0.01 | 0.002 | 0.003 | 0.004 | 0.003 | 0.8 | 0.4 |
| 87 | BE | CR | 0.22 | 0.005 | 1.3 | 0.01 | 0.002 | 0.003 | 0.004 | 0.003 | 0.8 | 0.4 |
| 88 | BF | CR | 0.22 | 0.005 | 1.3 | 0.01 | 0.002 | 0.003 | 0.004 | 0.003 | 0.9 | 0.2 |
| 89 | BG | CR | 0.22 | 0.005 | 1.3 | 0.01 | 0.002 | 0.003 | 0.004 | 0.003 | 0.2 | |
| 90 | BH | CR | 0.22 | 0.005 | 1.3 | 0.01 | 0.002 | 0.003 | 0.004 | 0.003 | 0.2 | |

| Ex. no. | Cr + Mo | O | B | Martensite area rate | Delayed fracture characteristic | Oxide average particle size | Crushed voids | Class |
|---|---|---|---|---|---|---|---|---|
| 57 | 0.2 | 0.0233 | 0.0048 | P | VG | G | G | Comp. ex. |
| 58 | 0.2 | 0.0134 | 0.0045 | G | VG | G | G | Inv. ex. |
| 59 | 0.2 | 0.0121 | 0.0054 | G | VG | G | G | Inv. ex. |
| 60 | 0.2 | 0.0025 | 0.0043 | G | P | P | — | Comp. ex. |
| 61 | 0.2 | 0.0173 | 0.0044 | G | VG | G | G | Inv. ex. |
| 62 | 0.2 | 0.0103 | 0.0048 | G | G | G | G | Inv. ex. |
| 63 | 0.2 | 0.003 | 0.0049 | G | F | G | G | Inv. ex. |
| 63-1 | 0.2 | 0.003 | 0.0049 | G | F | G | G | Inv. ex. |
| 64 | 0.2 | 0.0013 | 0.0049 | G | P | P | — | Comp. ex. |
| 65 | 0.2 | 0.0144 | 0.0053 | P | P | — | — | Comp. ex. |
| 65-1 | 0.2 | 0.0144 | 0.0053 | G | F | G | G | Inv. ex. |
| 66 | 0.2 | 0.0155 | 0.0048 | G | P | G | G | Comp. ex. |
| 67 | 0.2 | 0.0157 | 0.0053 | G | VG | G | G | Inv. ex. |
| 68 | 0.2 | 0.0148 | 0.0055 | G | G | G | G | Inv. ex. |
| 69 | 0.2 | 0.0153 | 0.0054 | G | F | G | G | Inv. ex. |
| 70 | 0.2 | 0.0163 | 0.0048 | G | G | G | G | Inv. ex. |
| 71 | 0.2 | 0.0163 | 0.0048 | G | F | G | G | Inv. ex. |
| 72 | 0.2 | 0.024 | 0.0053 | G | G | G | G | Inv. ex. |
| 73 | 0.2 | 0.0183 | 0.0054 | G | VG | G | G | Inv. ex. |
| 74 | 0.2 | 0.0102 | 0.0053 | G | G | G | G | Inv. ex. |
| 75 | 0.2 | 0.0018 | 0.0047 | G | P | P | — | Comp. ex. |
| 76 | 0.2 | 0.0173 | 0.0045 | G | VG | G | G | Inv. ex. |
| 77 | 0.2 | 0.0166 | 0.0045 | G | VG | G | G | Inv. ex. |
| 78 | 0.2 | 0.0107 | 0.0054 | G | G | G | G | Inv. ex. |
| 79 | 0.2 | 0.0008 | 0.0055 | G | P | P | — | Comp. ex. |
| 80 | 0.078 | 0.0145 | 0.0058 | G | VG | G | G | Inv. ex. |
| 81 | 0.12 | 0.0156 | 0.0049 | G | VG | G | G | Inv. ex. |
| 82 | 1.2 | 0.0161 | 0.0053 | G | VG | G | G | Inv. ex. |
| 83 | 1 | 0.0146 | 0.0055 | G | VG | G | G | Inv. ex. |
| 84 | 2.22 | 0.0153 | 0.005 | G | P | G | G | Comp. ex. |
| 85 | 2 | 0.0153 | 0.0048 | G | F | G | G | Inv. ex. |
| 86 | 1.2 | 0.0155 | 0.0005 | G | VG | G | G | Inv. ex. |
| 87 | 1.2 | 0.0155 | 0.001 | G | VG | G | G | Inv. ex. |
| 88 | 1.1 | 0.0143 | 0.0024 | G | VG | G | G | Inv. ex. |
| 89 | 0.2 | 0.0134 | 0.0073 | G | VG | G | G | Inv. ex. |
| 90 | 0.2 | 0.0143 | 0.0134 | G | F | G | G | Inv. ex. |

TABLE 2-1

(mass %)

| Ex. no. | Steel type | Base steel type | Steel sheet type | Nb | V | Co | W | Ni | Cu | Nb + V + Co + W | Ni + Cu | Martensite area rate | Delayed fracture characteristic | Oxide average particle size | Crushed voids | Class |
|---|---|---|---|---|---|---|---|---|---|---|---|---|---|---|---|---|
| 91 | BI | A | CR | | | | | 0.02 | 0.01 | | 0.03 | G | VG | G | G | Inv. ex. |
| 92 | BJ | A | CR | | | | | 0.01 | 0.032 | | 0.04 | G | VG | G | G | Inv. ex. |
| 93 | BK | A | CR | | | | | 0.5 | | | 0.50 | G | VG | G | G | Inv. ex. |
| 94 | BL | A | CR | | | | | 1 | | | 1.00 | G | VG | G | G | Inv. ex. |
| 95 | BM | A | CR | | | | | 0.5 | 0.04 | | 0.54 | G | VG | G | G | Inv. ex. |
| 96 | BN | A | CR | | | | | 1.4 | 0.8 | | 2.20 | G | F | G | G | Inv. ex. |
| 97 | BO | A | CR | | | | | 1 | 1.5 | | 2.50 | G | F | G | G | Inv. ex. |
| 98 | BP | A | CR | 0.008 | | | | | | 0.008 | | G | VG | G | G | Inv. ex. |
| 99 | BQ | A | CR | 0.03 | | | | | | 0.030 | | G | VG | G | G | Inv. ex. |
| 100 | BR | A | CR | 0.08 | | | | | | 0.080 | | G | VG | G | G | Inv. ex. |
| 101 | BS | A | CR | | 0.05 | | | | | 0.050 | | G | VG | G | G | Inv. ex. |
| 102 | BT | A | CR | | 0.5 | | | | | 0.500 | | G | VG | G | G | Inv. ex. |
| 103 | BU | A | CR | | 0.8 | | | | | 0.800 | | G | VG | G | G | Inv. ex. |
| 104 | BV | A | CR | | | 0.03 | | | | 0.030 | | G | VG | G | G | Inv. ex. |
| 105 | BW | A | CR | | | 0.02 | | | | 0.020 | | G | VG | G | G | Inv. ex. |
| 106 | BX | A | CR | 0.03 | 0.2 | | | | | 0.230 | | G | VG | G | G | Inv. ex. |
| 107 | BY | A | CR | 0.05 | 0.3 | | | | | 0.350 | | G | VG | G | G | Inv. ex. |

TABLE 2-1-continued (mass %)

| Ex. no. | Steel type | Base steel type | Steel sheet type | Nb | V | Co | W | Ni | Cu | Nb + V + Co + W | Ni + Cu | Martensite area rate | Delayed fracture characteristic | Oxide average particle size | Crushed voids | Class |
|---|---|---|---|---|---|---|---|---|---|---|---|---|---|---|---|---|
| 108 | BZ | A | CR | 0.04 | | | 0.03 | | | 0.070 | | G | VG | G | G | Inv. ex. |
| 109 | CA | A | CR | 0.08 | | | 0.2 | | | 0.280 | | G | VG | G | G | Inv. ex. |
| 110 | CB | A | CR | 0.08 | 0.5 | 0.1 | 0.8 | | | 1.480 | | G | F | G | G | Inv. ex. |
| 111 | CC | A | CR | 0.04 | 0.3 | | | 0.01 | 0.03 | 0.340 | 0.04 | G | VG | G | G | Inv. ex. |
| 112 | CD | A | CR | 0.04 | 0.3 | | | 1 | 0.03 | 0.340 | 1.03 | G | VG | G | G | Inv. ex. |
| 113 | CE | A | CR | 0.04 | 0.3 | | | 1.3 | 0.5 | 0.340 | 1.800 | G | VG | G | G | Inv. ex. |
| 114 | CF | A | CR | 0.04 | 0.3 | 0.1 | | 1.3 | 0.5 | 0.440 | 1.800 | G | VG | G | G | Inv. ex. |
| 115 | CG | A | CR | 0.1 | 0.3 | 0.1 | | 1.3 | 0.7 | 0.500 | 2.000 | G | VG | G | G | Inv. ex. |
| 116 | CH | A | CR | 0.55 | 0.3 | 0.1 | 0.05 | 1.3 | 0.5 | 1.000 | 1.800 | G | VG | G | G | Inv. ex. |
| 117 | CI | X | CR | | | | | 0.02 | 0.01 | | 0.03 | G | VG | G | G | Inv. ex. |
| 118 | CJ | X | CR | | | | | 0.01 | 0.032 | | 0.04 | G | VG | G | G | Inv. ex. |
| 119 | CK | X | CR | | | | | 0.5 | | | 0.50 | G | VG | G | G | Inv. ex. |
| 120 | CL | X | CR | | | | | 1 | | | 1.00 | G | VG | G | G | Inv. ex. |
| 121 | CM | X | CR | | | | | 0.5 | 0.04 | | 0.54 | G | VG | G | G | Inv. ex. |
| 122 | CN | X | CR | | | | | 1.4 | 0.8 | | 2.20 | G | F | G | G | Inv. ex. |

TABLE 2-2

(mass %)

| Ex. no. | Steel type | Base steel type | Steel sheet type | Nb | V | Co | W | Ni | Cu | Nb + V + Co + W | Ni + Cu | Martensite area rate | Delayed fracture characteristic | Oxide average particle size | Crushed voids | Class |
|---|---|---|---|---|---|---|---|---|---|---|---|---|---|---|---|---|
| 123 | CO | X | CR | | | | | 1 | 1.5 | | 2.50 | G | F | G | G | Inv. ex. |
| 124 | CP | X | CR | 0.005 | | | | | | 0.005 | | G | VG | G | G | Inv. ex. |
| 125 | CQ | X | CR | 0.032 | | | | | | 0.032 | | G | VG | G | G | Inv. ex. |
| 126 | CR | X | CR | 0.081 | | | | | | 0.081 | | G | VG | G | G | Inv. ex. |
| 127 | CS | X | CR | | 0.053 | | | | | 0.053 | | G | VG | G | G | Inv. ex. |
| 128 | CT | X | CR | | 0.48 | | | | | 0.480 | | G | VG | G | G | Inv. ex. |
| 129 | CU | X | CR | | 0.79 | | | | | 0.790 | | G | VG | G | G | Inv. ex. |
| 130 | CV | X | CR | | | 0.03 | | | | 0.030 | | G | VG | G | G | Inv. ex. |
| 131 | CW | X | CR | | | 0.02 | | | | 0.020 | | G | VG | G | G | Inv. ex. |
| 132 | CX | X | CR | 0.03 | 0.2 | | | | | 0.230 | | G | VG | G | G | Inv. ex. |
| 133 | CY | X | CR | 0.048 | 0.3 | | | | | 0.348 | | G | VG | G | G | Inv. ex. |
| 134 | CZ | X | CR | 0.04 | | | 0.03 | | | 0.070 | | G | VG | G | G | Inv. ex. |
| 135 | DA | X | CR | 0.08 | | | 0.2 | | | 0.280 | | G | VG | G | G | Inv. ex. |
| 136 | DB | X | CR | 0.09 | 0.5 | 0.1 | 0.8 | | | 1.490 | | G | F | G | G | Inv. ex. |
| 137 | DC | X | CR | 0.05 | 0.3 | | | 0.01 | 0.03 | 0.350 | 0.04 | G | VG | G | G | Inv. ex. |
| 138 | DD | X | CR | 0.05 | 0.3 | | | 1 | 0.03 | 0.350 | 1.03 | G | VG | G | G | Inv. ex. |
| 139 | DE | X | CR | 0.05 | 0.3 | | | 1.3 | 0.5 | 0.350 | 1.800 | G | VG | G | G | Inv. ex. |
| 140 | DF | X | CR | 0.05 | 0.3 | 0.1 | | 1.3 | 0.5 | 0.450 | 1.800 | G | VG | G | G | Inv. ex. |
| 141 | DG | X | CR | 0.15 | 0.3 | 0.1 | | 1.3 | 0.7 | 0.550 | 2.000 | G | VG | G | G | Inv. ex. |
| 142 | DH | X | CR | 0.55 | 0.3 | 0.1 | 0.05 | 1.3 | 0.5 | 1.000 | 1.800 | G | VG | G | G | Inv. ex. |
| 143 | DC | X | AL | 0.05 | 0.3 | | | 0.01 | 0.03 | 0.350 | 0.04 | G | VG | G | G | Inv. ex. |
| 144 | DD | X | AL | 0.05 | 0.3 | | | 1 | 0.03 | 0.350 | 1.03 | G | VG | G | G | Inv. ex. |
| 145 | DE | X | AL | 0.05 | 0.3 | | | 1.3 | 0.5 | 0.350 | 1.800 | G | VG | G | G | Inv. ex. |
| 146 | DF | X | AL | 0.05 | 0.3 | 0.1 | | 1.3 | 0.5 | 0.450 | 1.800 | G | VG | G | G | Inv. ex. |
| 147 | DG | X | AL | 0.15 | 0.3 | 0.1 | | 1.3 | 0.7 | 0.550 | 2.000 | G | VG | G | G | Inv. ex. |
| 148 | DH | X | AL | 0.55 | 0.3 | 0.1 | 0.05 | 1.3 | 0.5 | 1.000 | 1.800 | G | VG | G | G | Inv. ex. |
| 149 | DC | X | GI | 0.05 | 0.3 | | | 0.01 | 0.03 | 0.350 | 0.04 | G | VG | G | G | Inv. ex. |
| 150 | DD | X | GI | 0.05 | 0.3 | | | 1 | 0.03 | 0.350 | 1.03 | G | VG | G | G | Inv. ex. |
| 151 | DE | X | GI | 0.05 | 0.3 | | | 1.3 | 0.5 | 0.350 | 1.800 | G | VG | G | G | Inv. ex. |
| 152 | DF | X | GI | 0.05 | 0.3 | 0.1 | | 1.3 | 0.5 | 0.450 | 1.800 | G | VG | G | G | Inv. ex. |
| 153 | DG | X | GI | 0.15 | 0.3 | 0.1 | | 1.3 | 0.7 | 0.550 | 2.000 | G | VG | G | G | Inv. ex. |
| 154 | DH | X | GI | 0.55 | 0.3 | 0.1 | 0.05 | 1.3 | 0.5 | 1.000 | 1.800 | G | VG | G | G | Inv. ex. |
| 155 | DC | X | GA | 0.05 | 0.3 | | | 0.01 | 0.03 | 0.350 | 0.04 | G | VG | G | G | Inv. ex. |

TABLE 2-3

(mass %)

| Ex. no. | Steel type | Base steel type | Steel sheet type | Nb | V | Co | W | Ni | Cu | Nb + V + Co + W | Ni + Cu | Martensite area rate | Delayed fracture characteristic | Oxide average particle size | Crushed voids | Class |
|---|---|---|---|---|---|---|---|---|---|---|---|---|---|---|---|---|
| 156 | DD | X | GA | 0.05 | 0.3 | | | 1 | 0.03 | 0.350 | 1.03 | G | VG | G | G | Inv. ex. |
| 157 | DE | X | GA | 0.05 | 0.3 | | | 1.3 | 0.5 | 0.350 | 1.800 | G | VG | G | G | Inv. ex. |
| 158 | DF | X | GA | 0.05 | 0.3 | 0.1 | | 1.3 | 0.5 | 0.450 | 1.800 | G | VG | G | G | Inv. ex. |
| 159 | DG | X | GA | 0.15 | 0.3 | 0.1 | | 1.3 | 0.7 | 0.550 | 2.000 | G | VG | G | G | Inv. ex. |
| 160 | DH | X | GA | 0.55 | 0.3 | 0.1 | 0.05 | 1.3 | 0.5 | 1.000 | 1.800 | G | VG | G | G | Inv. ex. |
| 161 | DI | AC | CR | | | | | 0.02 | 0.01 | | 0.03 | G | VG | G | G | Inv. ex. |
| 162 | DJ | AC | CR | | | | | 0.01 | 0.032 | | 0.04 | G | VG | G | G | Inv. ex. |
| 163 | DK | AC | CR | | | | | 0.5 | | | 0.50 | G | VG | G | G | Inv. ex. |
| 164 | DL | AC | CR | | | | | 1 | | | 1.00 | G | VG | G | G | Inv. ex. |
| 165 | DM | AC | CR | | | | | 0.5 | 0.04 | | 0.54 | G | VG | G | G | Inv. ex. |
| 166 | DN | AC | CR | | | | | 1.4 | 0.8 | | 2.20 | G | F | G | G | Inv. ex. |
| 167 | DO | AC | CR | | | | | 1 | 1.5 | | 2.50 | G | F | G | G | Inv. ex. |
| 168 | DP | AC | CR | 0.005 | | | | | | 0.005 | | G | VG | G | G | Inv. ex. |
| 169 | DQ | AC | CR | 0.032 | | | | | | 0.032 | | G | VG | G | G | Inv. ex. |
| 170 | DR | AC | CR | 0.081 | | | | | | 0.081 | | G | VG | G | G | Inv. ex. |
| 171 | DS | AC | CR | | 0.053 | | | | | 0.053 | | G | VG | G | G | Inv. ex. |
| 172 | DT | AC | CR | | 0.48 | | | | | 0.480 | | G | VG | G | G | Inv. ex. |
| 173 | DU | AC | CR | | 0.79 | | | | | 0.790 | | G | VG | G | G | Inv. ex. |
| 174 | DV | AC | CR | | | | 0.03 | | | 0.030 | | G | VG | G | G | Inv. ex. |
| 175 | DW | AC | CR | | | 0.02 | | | | 0.020 | | G | VG | G | G | Inv. ex. |
| 176 | DX | AC | CR | 0.03 | 0.2 | | | | | 0.230 | | G | VG | G | G | Inv. ex. |
| 177 | DY | AC | CR | 0.048 | 0.3 | | | | | 0.348 | | G | VG | G | G | Inv. ex. |
| 178 | DZ | AC | CR | 0.04 | | | 0.03 | | | 0.070 | | G | VG | G | G | Inv. ex. |
| 179 | EA | AC | CR | 0.08 | | | 0.2 | | | 0.280 | | G | VG | G | G | Inv. ex. |
| 180 | EB | AC | CR | 0.09 | 0.5 | 0.1 | 0.8 | | | 1.490 | | G | F | G | G | Inv. ex. |
| 181 | EC | AC | CR | 0.05 | 0.3 | | | 0.01 | 0.03 | 0.350 | 0.04 | G | VG | G | G | Inv. ex. |
| 182 | ED | AC | CR | 0.05 | 0.3 | | | 1 | 0.03 | 0.350 | 1.03 | G | VG | G | G | Inv. ex. |
| 183 | EF | AC | CR | 0.05 | 0.3 | | | 1.3 | 0.5 | 0.350 | 1.800 | G | VG | G | G | Inv. ex. |
| 184 | EG | AC | CR | 0.05 | 0.3 | 0.1 | | 1.3 | 0.5 | 0.450 | 1.800 | G | VG | G | G | Inv. ex. |
| 185 | EH | AC | CR | 0.15 | 0.3 | 0.1 | | 1.3 | 0.7 | 0.550 | 2.000 | G | VG | G | G | Inv. ex. |
| 186 | EI | AC | CR | 0.55 | 0.3 | 0.1 | 0.05 | 1.3 | 0.5 | 1.000 | 1.800 | G | VG | G | G | Inv. ex. |

Example 2

The Steel Types A, X, and AC which are shown in Tables 1-1 and 1-2 were used to study the rolling conditions. These slabs were heated to 1050 to 1350° C. then hot rolled by a finish temperature of 800 to 900° C. and a coiling temperature of 450 to 680° C. to obtain hot rolled steel sheets. The slabs, rough rolled sheets, the thickness and rough rolling rate of the hot rolled sheets, and the final rolling rate are shown in Tables 3-1 and 3-2. After that, part of the hot rolled steel sheets were pickled, then cold rolled. The cold rolled sheet thickness and cold rolling rate are shown in Tables 3-1 and 3-2. After that, part of the steel sheets was continuously annealed (annealing temperature 720 to 830° C.). Further, parts of the steel sheets were hot dip galvanized (basis weight: one side 30 to 90 g/m²), hot dip galvannealed (basis weight: one side 30 to 90 g/m²), and hot dip aluminum coated (basis weight: one side 30 to 100 g/m²) on a continuous hot dipping line. The steel sheet types are shown in Tables 3. The types of steel sheets are shown below:
HR: hot rolled steel sheet, CR: cold rolled steel sheet (annealed material), AL: hot dip aluminum coated steel sheet, GI: hot dip galvanized steel sheet, and GA: hot dip galvannealed steel sheet.

The average particle size of the Fe—Mn composite oxides in a produced steel sheet and the presence of crushed voids were determined by polishing a cross-section of the steel sheet, then observing it by an optical microscope or scan type electron microscope or by a transmission type electron microscope after preparing the sample into a thin film. The results are shown in Tables 3-1 to 3-2. The judgment criteria are shown below:

Average particle size of composite oxides:
Good: average diameter 0.1 to 15 μm,
Poor: average diameter less than 0.1 μm or over 15 μm
Crushed voids around composite oxides:
Good: average size of voids 0.1 μm or more
Poor: average size of voids less than 0.1 μm After that, these cold rolled steel sheets were heated by a heating furnace to over the Ac3 point, that is, the 880 to 950° C. austenite region, then were hot worked. For the atmosphere of the heating furnace, combustion exhaust gas was used. The hydrogen concentration in the atmosphere was 2%, while the dew-point was 20° C.

The cross-section of the shape of the die set which is used in the examples is shown in FIG. 4. FIG. 4 shows the shapes of the die 9 and punch 10. The shape of the punch as seen from above is shown in FIG. 5. FIG. 5 shows the punch 10. The shape of the die as seen from below is shown in FIG. 6. FIG. 6 shows the die 9. In the die set, the shape of the die is determined based on the punch with a clearance of the sheet thickness of 1.6 mm. The blank size was made 1.6 mm thickness×300 mm×500 mm. The shaping conditions were made a punch speed of 10 mm/s, a pressing force of 200 tons, and a holding time at bottom dead center of 5 seconds. A schematic view of the hot pressed part is shown in FIG. 7.

The quenching characteristic of the steel sheet was evaluated by polishing the cross-section, corroding it by Nital, then observing the microstructure by an optical microscope and determining the area rate of martensite. The results of judgment are shown in Tables 3-1 and 3-2. The judgment criteria are shown below:

Good: martensite area rate 90% or more,
Fair: martensite area rate 80% or more, and
Poor: martensite area rate less than 80%.

The delayed fracture resistance was evaluated by imparting stress by piercing. The pierce hole position 13 at the center of the test part 12 which is shown in FIG. 8 was pierced using a diameter 10 mm punch and using a die of a diameter giving a clearance 15%±2. FIG. 8 shows the shape of the part seen from above. FIG. 8 shows the part 12 and the pierce hole center 13. The piercing was performed within 30 minutes after hot shaping. The number of parts observed was 10. For judgment of the hydrogen embrittlement resistance, the entire circumference of the hole was observed one week after piercing to judge the presence of any cracks. The state was observed by a loupe or electron microscope. The results of judgment are shown in Tables 3-1 and 3-2. The judgment criteria are shown below:

Total of number of parts with fine cracks in 10 parts:
Very good: 0,
Good: 1,
Fair: less than 5, and
Poor: 5 or more.

As shown in Tables 3-1 and 3-2, it is learned that if in the scope of the method of production which is recommended by the present invention, steel sheet can be realized which is sufficiently strengthened by die quenching by hot stamping and which is more excellent in delayed fracture resistance.

TABLE 3-1

| Ex. no. | Steel type | Rolling | Steel sheet type | Slab thickness (mm) | Rough rolling thickness (mm) | Hot rolling thickness (mm) | Cold rolling thickness (mm) | Rough rolling rate (%) | Final rolling rate (%) | Cold rolling rate (%) | Martensite area rate | Delayed fracture rate | Oxide average particle size | Crushed void | Class |
|---|---|---|---|---|---|---|---|---|---|---|---|---|---|---|---|
| 187 | A | HR | N | 250 | 20 | 6.5 | | 92 | 67.5 | | G | P | P | P | Comp. ex. |
| 187-1 | A | HR | N | 250 | 20 | 6 | | 92 | 70.0 | | G | G | G | G | Inv. ex. |
| 188 | A | HR | N | 250 | 30 | 6.5 | | 88 | 78.3 | | G | F | G | G | Inv. ex. |
| 189 | A | HR | N | 250 | 40 | 6.5 | | 84 | 83.8 | | G | G | G | G | Inv. ex. |
| 190 | A | HR | N | 100 | 40 | 3 | | 60 | 92.5 | | G | P | P | P | Comp. ex. |
| 191 | A | HR | N | 150 | 40 | 3 | | 73.333 | 92.5 | | G | F | G | G | Inv. ex. |
| 192 | A | HR | AL | 150 | 40 | 3 | | 73.333 | 92.5 | | G | F | G | G | Inv. ex. |
| 193 | A | HR | GI | 150 | 40 | 3 | | 73.333 | 92.5 | | G | F | G | G | Inv. ex. |
| 194 | A | HR | GA | 150 | 40 | 3 | | 73.333 | 92.5 | | G | F | G | G | Inv. ex. |
| 195 | A | HR | N | 200 | 40 | 3 | | 80 | 92.5 | | G | G | G | G | Inv. ex. |
| 196 | A | HR | N | 250 | 40 | 3 | | 84 | 92.5 | | G | G | G | G | Inv. ex. |
| 197 | A | CR | N | 250 | 40 | 1.5 | 1.2 | 84 | 96.3 | 20.0 | G | P | P | G | Comp. ex. |
| 198 | A | CR | N | 250 | 40 | 1.9 | 1.2 | 84 | 95.3 | 36.8 | G | F | G | G | Inv. ex. |
| 199 | A | CR | N | 250 | 40 | 2.5 | 1.2 | 84 | 93.8 | 52.0 | G | G | G | G | Inv. ex. |
| 200 | A | CR | A | 250 | 40 | 2.5 | 1.2 | 84 | 93.8 | 52.0 | G | G | G | G | Inv. ex. |
| 201 | A | CR | AL | 250 | 40 | 2.5 | 1.2 | 84 | 93.8 | 52.0 | G | G | G | G | Inv. ex. |
| 202 | A | CR | GI | 250 | 40 | 2.5 | 1.2 | 84 | 93.8 | 52.0 | G | G | G | G | Inv. ex. |
| 203 | A | CR | GA | 250 | 40 | 2.5 | 1.2 | 84 | 93.8 | 52.0 | G | G | G | G | Inv. ex. |
| 204 | A | CR | N | 250 | 40 | 3 | 1.2 | 84 | 92.5 | 60.0 | G | VG | G | G | Inv. ex. |
| 205 | A | CR | N | 250 | 40 | 4 | 1.2 | 84 | 90.0 | 70.0 | G | VG | G | G | Inv. ex. |
| 206 | A | CR | N | 250 | 40 | 5 | 1.2 | 84 | 87.5 | 76.0 | G | VG | G | G | Inv. ex. |
| 207 | X | HR | N | 250 | 20 | 6.5 | | 92 | 67.5 | | G | P | P | P | Comp. ex. |
| 207-1 | X | HR | N | 250 | 20 | 6 | | 92 | 70.0 | | G | G | G | G | Inv. ex. |
| 208 | X | HR | N | 250 | 30 | 6.5 | | 88 | 78.3 | | G | F | G | G | Inv. ex. |
| 209 | X | HR | N | 250 | 40 | 6.5 | | 84 | 83.8 | | G | G | G | G | Inv. ex. |
| 210 | X | HR | N | 100 | 40 | 3 | | 60 | 92.5 | | G | P | P | P | Comp. ex. |
| 211 | X | HR | N | 150 | 40 | 3 | | 73.333 | 92.5 | | G | F | G | G | Inv. ex. |
| 212 | X | HR | N | 200 | 40 | 3 | | 80 | 92.5 | | G | G | G | G | Inv. ex. |
| 213 | X | HR | N | 250 | 40 | 3 | | 84 | 92.5 | | G | G | G | G | Inv. ex. |
| 214 | X | HR | AL | 250 | 40 | 3 | | 84 | 92.5 | | G | G | G | G | Inv. ex. |
| 215 | X | HR | GI | 250 | 40 | 3 | | 84 | 92.5 | | G | G | G | G | Inv. ex. |

TABLE 3-2

| Ex. no. | Steel type | Rolling | Steel sheet type | Slab thickness (mm) | Rough rolling thickness (mm) | Hot rolling thickness (mm) | Cold rolling thickness (mm) | Rough rolling rate (%) | Final rolling rate (%) | Cold rolling rate (%) | Martensite area rate | Delayed fracture rate | Oxide average particle size | Crushed void | Class |
|---|---|---|---|---|---|---|---|---|---|---|---|---|---|---|---|
| 216 | X | CR | GA | 250 | 40 | 3 | | 84 | 92.5 | | G | G | G | G | Inv. ex. |
| 217 | X | CR | N | 250 | 40 | 1.5 | 1.2 | 84 | 96.3 | 20.0 | G | P | P | G | Comp. ex. |
| 218 | X | CR | N | 250 | 40 | 1.9 | 1.2 | 84 | 95.3 | 36.8 | G | F | G | G | Inv. ex. |
| 219 | X | CR | N | 250 | 40 | 2.5 | 1.2 | 84 | 93.8 | 52.0 | G | G | G | G | Inv. ex. |
| 220 | X | CR | N | 250 | 40 | 3 | 1.2 | 84 | 92.5 | 60.0 | G | VG | G | G | Inv. ex. |
| 221 | X | CR | N | 250 | 40 | 4 | 1.2 | 84 | 90.0 | 70.0 | G | VG | G | G | Inv. ex. |
| 222 | X | CR | A | 250 | 40 | 4 | 1.2 | 84 | 90.0 | 70.0 | G | G | G | G | Inv. ex. |
| 223 | X | CR | AL | 250 | 40 | 4 | 1.2 | 84 | 90.0 | 70.0 | G | G | G | G | Inv. ex. |
| 224 | X | CR | GI | 250 | 40 | 4 | 1.2 | 84 | 90.0 | 70.0 | G | G | G | G | Inv. ex. |
| 225 | X | CR | GA | 250 | 40 | 4 | 1.2 | 84 | 90.0 | 70.0 | G | G | G | G | Inv. ex. |
| 226 | X | CR | N | 250 | 40 | 5 | 1.2 | 84 | 87.5 | 76.0 | G | VG | G | G | Inv. ex. |
| 227 | AC | HR | N | 250 | 20 | 6.5 | | 92 | 67.5 | | G | P | P | P | Comp. ex. |
| 228 | AC | HR | N | 250 | 30 | 6.5 | | 88 | 78.3 | | G | F | G | G | Inv. ex. |
| 229 | AC | HR | N | 250 | 40 | 6.5 | | 84 | 83.8 | | G | G | G | G | Inv. ex. |

TABLE 3-2-continued

| Ex. no. | Steel type | Rolling | Steel sheet type | Slab thickness (mm) | Rough rolling thickness (mm) | Hot rolling thickness (mm) | Cold rolling thickness (mm) | Rough rolling rate (%) | Final rolling rate (%) | Cold rolling rate (%) | Martensite area rate | Delayed fracture rate | Oxide average particle size | Crushed void | Class |
|---|---|---|---|---|---|---|---|---|---|---|---|---|---|---|---|
| 230 | AC | HR | N | 100 | 40 | 3 | | 60 | 92.5 | | G | P | P | P | Comp. ex. |
| 231 | AC | HR | N | 150 | 40 | 3 | | 73.333 | 92.5 | | G | F | G | G | Inv. ex. |
| 232 | AC | HR | N | 200 | 40 | 3 | | 80 | 92.5 | | G | G | G | G | Inv. ex. |
| 233 | AC | HR | AL | 200 | 40 | 3 | | 80 | 92.5 | | G | G | G | G | Inv. ex. |
| 234 | AC | HR | GI | 200 | 40 | 3 | | 80 | 92.5 | | G | G | G | G | Inv. ex. |
| 235 | AC | HR | GA | 200 | 40 | 3 | | 80 | 92.5 | | G | G | G | G | Inv. ex. |
| 236 | AC | HR | N | 250 | 40 | 3 | | 84 | 92.5 | | G | G | G | G | Inv. ex. |
| 237 | AC | CR | N | 250 | 40 | 1.5 | 1.2 | 84 | 96.3 | 20.0 | G | P | P | G | Comp. ex. |
| 238 | AC | CR | N | 250 | 40 | 1.9 | 1.2 | 84 | 95.3 | 36.8 | G | F | G | G | Inv. ex. |
| 239 | AC | CR | A | 250 | 40 | 1.9 | 1.2 | 84 | 95.3 | 36.8 | G | F | G | G | Inv. ex. |
| 240 | AC | CR | AL | 250 | 40 | 1.9 | 1.2 | 84 | 95.3 | 36.8 | G | F | G | G | Inv. ex. |
| 241 | AC | CR | GI | 250 | 40 | 1.9 | 1.2 | 84 | 95.3 | 36.8 | G | F | G | G | Inv. ex. |
| 242 | AC | CR | GA | 250 | 40 | 1.9 | 1.2 | 84 | 95.3 | 36.8 | G | F | G | G | Inv. ex. |
| 243 | AC | CR | N | 250 | 40 | 2.5 | 1.2 | 84 | 93.8 | 52.0 | G | G | G | G | Inv. ex. |
| 244 | AC | CR | N | 250 | 40 | 3 | 1.2 | 84 | 92.5 | 60.0 | G | VG | G | G | Inv. ex. |
| 245 | AC | CR | N | 250 | 40 | 4 | 1.2 | 84 | 90.0 | 70.0 | G | VG | G | G | Inv. ex. |
| 246 | AC | CR | N | 250 | 40 | 5 | 1.2 | 84 | 87.5 | 76.0 | G | VG | G | G | Inv. ex. |

INDUSTRIAL APPLICABILITY

The present invention can be used as a steel material for hot stamping use. Regarding its field of use, this can be utilized in a broad range of industrial fields such as auto parts, home electrical appliances, machinery, etc.

REFERENCE SIGNS LIST 1 coarse composite oxides
1-1, 1-2 oxides
2 hot rough rolling
3 stretched composite oxides
3-1, 3-2 stretched oxides
4 hot final rolling
5 crushed void (hydrogen trapping ability)
5-1 and 5-2 crushed oxides
6 coarse oxides
6' fine oxides
7 stretched oxides
8 crushed oxides
9 die
10 punch
11 hot stamped part
12 test part
13 pierced hole position

The invention claimed is:

1. A steel sheet for hot stamping use which is comprised of chemical ingredients which contain, by mass %,
C: 0.05 to 0.40%,
Si: 0.001 to 0.02%,
Mn: 0.1 to 3%,
Al: 0.0002 to 0.005%,
Ti: 0.0005 to 0.01%,
O: 0.003 to 0.03%,
N: 0.006% or less,
one or more of Cr and Mo in a total of 0.005 to 2%, and
a balance of Fe and unavoidable impurities,
provided that said steel sheet contains no W,
wherein the steel sheet contains average diameter 0.1 to 15 μm Fe—Mn-based composite oxide particles dispersed in the steel sheet.

2. The steel sheet for hot stamping use as set forth in claim 1 which further contains, by mass %, the ingredients which are included in one or more groups among the three groups of (a) to (c):
(a) B: 0.0005 to 0.01%;
(b) one or more of Nb, V, and Co in a total of 0.005 to 1%; and
(c) one or more of Ni and Cu in a total of 0.005 to 2%.

3. The steel sheet for hot stamping use as set forth in claim 1 or 2, wherein there are voids around said composite oxide particles.

4. The steel sheet for hot stamping use as set forth in claim 1 or 2, wherein the voids around said composite oxide particles have average sizes of 10 to 100% of the average size of said composite oxide particles.

5. The steel sheet for hot stamping use as set forth in claim 1 or 2, wherein the steel sheet is plated by any of aluminum plating, zinc-aluminum plating, and zinc plating.

* * * * *